United States Patent
Matsuno

(10) Patent No.: US 12,453,339 B2
(45) Date of Patent: Oct. 28, 2025

(54) FISHING ELECTRIC REEL

(71) Applicant: GLOBERIDE, Inc., Tokyo (JP)

(72) Inventor: Keisuke Matsuno, Tokyo (JP)

(73) Assignee: GLOBERIDE, INC, Tokyo (JP)

( * ) Notice: Subject to any disclaimer, the term of this patent is extended or adjusted under 35 U.S.C. 154(b) by 324 days.

(21) Appl. No.: 18/109,636

(22) Filed: Feb. 14, 2023

(65) Prior Publication Data

US 2023/0345923 A1 Nov. 2, 2023

(30) Foreign Application Priority Data

Apr. 27, 2022 (JP) ................................. 2022-073883

(51) Int. Cl.
*A01K 89/017* (2006.01)
*A01K 89/015* (2006.01)

(52) U.S. Cl.
CPC ...... *A01K 89/017* (2013.01); *A01K 89/01901* (2015.05)

(58) Field of Classification Search
CPC .. A01K 89/015; A01K 89/017; A01K 89/018; A01K 89/0186; A01K 89/0173; A01K 89/01901; A01K 89/01907; A01K 89/01903
See application file for complete search history.

(56) References Cited

U.S. PATENT DOCUMENTS

| 8,844,854 B2 * | 9/2014 | Jyo ...................... A01K 89/017 |
| | | 242/253 |
| 9,591,838 B2 * | 3/2017 | Haraguchi ......... A01K 89/0186 |
| 10,058,083 B2 * | 8/2018 | Nonogaki .......... A01K 89/0192 |

(Continued)

FOREIGN PATENT DOCUMENTS

| JP | 2000-69888 A | 3/2000 |
| JP | 2001095445 A | 4/2001 |

(Continued)

OTHER PUBLICATIONS

Sep. 13, 2023 Office Action issued in Taiwanese Patent Application No. 112113378.

(Continued)

*Primary Examiner* — Anna M Momper
(74) *Attorney, Agent, or Firm* — Oliff PLC

(57) ABSTRACT

A clutch mechanism has a clutch operating member that is rotated by an operation of a clutch lever and is brought into a driving force interruption state. A return mechanism causes the clutch mechanism that has been brought into the driving force interruption state to return to a driving force transmission state. The return mechanism comprises a returning gear that is provided on a motor shaft of an electric motor, a clutch returning rotator that meshes with the returning gear and rotates, and a kick member that is rotatably supported by the clutch operating member, rotates in conjunction with rotation of the clutch operating member to engage with/disengage from the clutch returning rotator, and causes the clutch operating member that has been brought into the driving force interruption state to return to the driving force transmission state. The clutch returning rotator and the kick member are disposed between a spool shaft and the motor shaft.

3 Claims, 21 Drawing Sheets

(56) References Cited

U.S. PATENT DOCUMENTS 10,253,826 B2 * 4/2019 Ahmad .............. A01K 89/0155
2015/0296762 A1 10/2015 Haraguchi

FOREIGN PATENT DOCUMENTS

| | | |
|---|---|---|
| JP | 2006-34140 A | 2/2006 |
| JP | 2006-254806 A | 9/2006 |
| JP | 2008289447 A | 12/2008 |
| JP | 2017-131129 A | 8/2017 |
| JP | 2019-068775 A | 5/2019 |
| TW | 201540181 A | 11/2015 |

OTHER PUBLICATIONS

Mar. 31, 2025 Office Action issued in Chinese Patent Application No. 202310379586.6.
Mar. 11, 2025 Office Action issued in Japanese Patent Application No. 2022-073883.

* cited by examiner

FISHING ELECTRIC REEL

CROSS-REFERENCE TO RELATED APPLICATION

This application claims priority under 35 U.S.C. § 119 to Japanese Patent Application No. 2022-073883 filed on Apr. 27, 2022 in the Japanese Patent Office, the entire contents of which is hereby incorporated by reference.

FIELD

The present disclosure relates to a fishing electric reel.

BACKGROUND

Conventionally, as a fishing electric reel, for example, a fishing electric reel disclosed in JP 2001-095445 A is known.

In the fishing electric reel disclosed in JP 2001-095445 A, a clutch mechanism that switches a power transmission state to a spool is provided in a frame of a reel body. The clutch mechanism includes an operation lever, and is configured to be switched from a clutch-on position in a driving force transmission state to a clutch-off position in a driving force interruption state by an operation of the operation lever. Further, the fishing electric reel includes a return mechanism that causes the clutch mechanism in the driving force interruption state to return to the driving force transmission state using a driving force of an electric motor.

The clutch mechanism includes a slide plate that moves from the clutch-on position to the clutch-off position by the operation of the operation lever, and an abutment piece protruding from the slide plate. On the other hand, the return mechanism includes a returning gear driven by reverse rotation of the electric motor, and a protrusion portion that abuts on the abutment piece of the slide plate.

In such a configuration, when the clutch mechanism is switched to the driving force interruption state by operating the operation lever, the slide plate slides from the clutch-on position to the clutch-off position, and the abutment piece enters a position where the abutment piece abuts on the protrusion portion of the returning gear in the process of the movement. When the electric motor is reversely rotated in the driving force interruption state, the protrusion portion of the clutch returning gear abuts on the abutment piece of the slide plate, and the slide plate is pushed up by an abutment force. As a result, the slide plate is returned from the clutch-off position to the clutch-on position, and the clutch mechanism is returned to the driving force transmission state.

SUMMARY

JP 2001-095445 A has a structure in which the slide plate linearly slides from the clutch-on position to the clutch-off position, and has a structure in which the abutment piece of the slide plate directly abuts on the protrusion portion of the clutch returning gear. For this reason, it is necessary to secure a wide slide space of the slide plate in the frame of the reel body, and there is a risk that a degree of freedom of the layout of the components is lowered. In particular, since the fishing electric reel has more components than a fishing reel having no electric motor, there is a risk that the reel body becomes large by securing the slide space of the slide plate.

The present disclosure has been made to solve the above problems, and provides a fishing electric reel that can increase a degree of freedom of the layout of components and prevent an increase in size of a reel body.

A fishing electric reel according to the present disclosure that solves the above problems comprises: a spool that is provided between frames of a reel body and rotates by receiving at least a driving force of an electric motor; a clutch mechanism that is provided on the side of one of the frames to which a handle shaft is attached and switches the spool between a driving force transmission state and a driving force interruption state; and a return mechanism that is provided on the side of one of the frames and causes the clutch mechanism that has been brought into the driving force interruption state to return to the driving force transmission state. The clutch mechanism has a clutch operating member that is rotated by an operation of a clutch lever and is brought into the driving force interruption state. The return mechanism comprises a returning gear that is provided on a motor shaft of the electric motor, a clutch returning rotator (gear B) that meshes with the returning gear and rotates, and a kick member that is rotatably supported by the clutch operating member, rotates in conjunction with rotation of the clutch operating member to engage with/disengage from the clutch returning rotator, and causes the clutch operating member that has been brought into the driving force interruption state to return to the driving force transmission state. The clutch returning rotator and the kick member are disposed between a spool shaft supporting the spool and the motor shaft.

According to the fishing electric reel, the kick member is rotatably supported by the frame, and rotates in conjunction with the clutch operating member to engage with/disengage from the clutch returning rotator. Therefore, it is possible to increase a degree of freedom of the layout of components and to prevent an increase in size of the reel body, as compared with a conventional configuration in which the returning member engages with/disengages from the clutch returning rotator by linear sliding movement.

In addition, since the clutch returning rotator and the kick member can be provided between the spool shaft and the motor shaft with high space efficiency, it is possible to increase the degree of freedom of the layout of the components, and it is possible to prevent an increase in size of the reel body.

Preferably, the clutch returning rotator comprises an engagement claw that engages with the kick member and a biasing member. In this case, preferably, the engagement claw is capable of changing a position around an axis of the clutch returning rotator, acquires a first position moved in a rotation direction of the clutch returning rotator and a second position moved in a direction opposite to the first position, and is biased from the second position toward the first position by a biasing force of the biasing member.

In this configuration, the engagement claw is movable in the direction opposite to the rotation direction of the clutch returning rotator against the biasing force of the biasing member. Therefore, even if the kick member interferes with the engagement claw at the time of engagement of the kick member and engages to push the engagement claw in the direction opposite to the rotation direction of the clutch returning rotator, the engagement claw is pushed by the kick member and flexibly moves in the opposite direction. As a result, the engagement state between the kick member and the engagement claw is favorably maintained. Therefore, the clutch mechanism can be quickly returned from the driving force interruption state to the driving force transmission state, and responsiveness of the return mechanism is excellent.

In addition, even if the kick member interferes with the engagement claw at the time of engagement of the kick member, the engagement state is favorably maintained. For this reason, it is not necessary to manage a stop position of the engagement claw toward a next return, and it is not necessary to provide a control unit for installing a sensor or the like for detecting the stop position of the engagement claw and adjusting the position of the engagement claw. Therefore, it is possible to realize cost reduction while preventing an increase in size of the reel body.

Preferably, the fishing electric reel further comprises: a handle operation return mechanism that causes the clutch mechanism that has been brought into the driving force interruption state by a rotation operation of a handle to return to the driving force transmission state. In this case, the handle operation return mechanism preferably comprises a ratchet that is attached to the handle shaft, and a handle interlocking kick member that engages with/disengages from the ratchet and causes the clutch operating member that has been brought into the driving force interruption state to return to the driving force transmission state.

In this configuration, since the clutch mechanism brought into the driving force interruption state by the rotation operation of the handle can be returned to the driving force transmission state, it is possible to obtain a fishing electric reel which is easy to use and excellent in fishing operability.

Preferably, the fishing electric reel further comprises: a driving control unit that controls driving of the electric motor in a forward rotation direction or a reverse rotation direction; a detection unit that detects that the clutch mechanism is in the driving force interruption state; a calculation unit that calculates a rotation speed of the spool associated with feeding of a fishing line and calculates a feeding amount of the fishing line; a rotation speed determination unit that determines whether or not the rotation speed of the spool calculated by the calculation unit satisfies a predetermined condition; and a feeding amount determination unit that determines whether or not the feeding amount of the fishing line calculated by the calculation unit has reached a preset feeding amount of the fishing line. In this case, preferably, when it is detected by the detection unit that the clutch mechanism is in the driving force interruption state and it is determined by the rotation speed determination unit that the rotation speed of the spool satisfies the predetermined condition, or when it is determined by the feeding amount determination unit that the feeding amount of the fishing line has reached the preset feeding amount of the fishing line, the driving control unit controls driving of the electric motor in the reverse rotation direction and causes the engagement claw of the clutch returning rotator to abut on the kick member.

In this configuration, when the clutch mechanism is in the driving force interruption state and the rotation speed of the spool satisfies the predetermined condition, or when the feeding amount of the fishing line has reached the preset feeding amount of the fishing line, the clutch mechanism brought into the driving force interruption state can be automatically returned to the driving force transmission state. Therefore, it is possible to obtain a fishing electric reel which is easy to use and excellent in fishing operability.

According to the present disclosure, it is possible to obtain a fishing electric reel that can prevent an increase in size and weight of a reel body.

DETAILED DESCRIPTION

Hereinafter, embodiments of a fishing electric reel according to the present disclosure will be described with reference to the drawings. In the following description, terms "front and rear", "left and right", and "up and down" are based on directions illustrated in FIG. 1.

Figure 1:
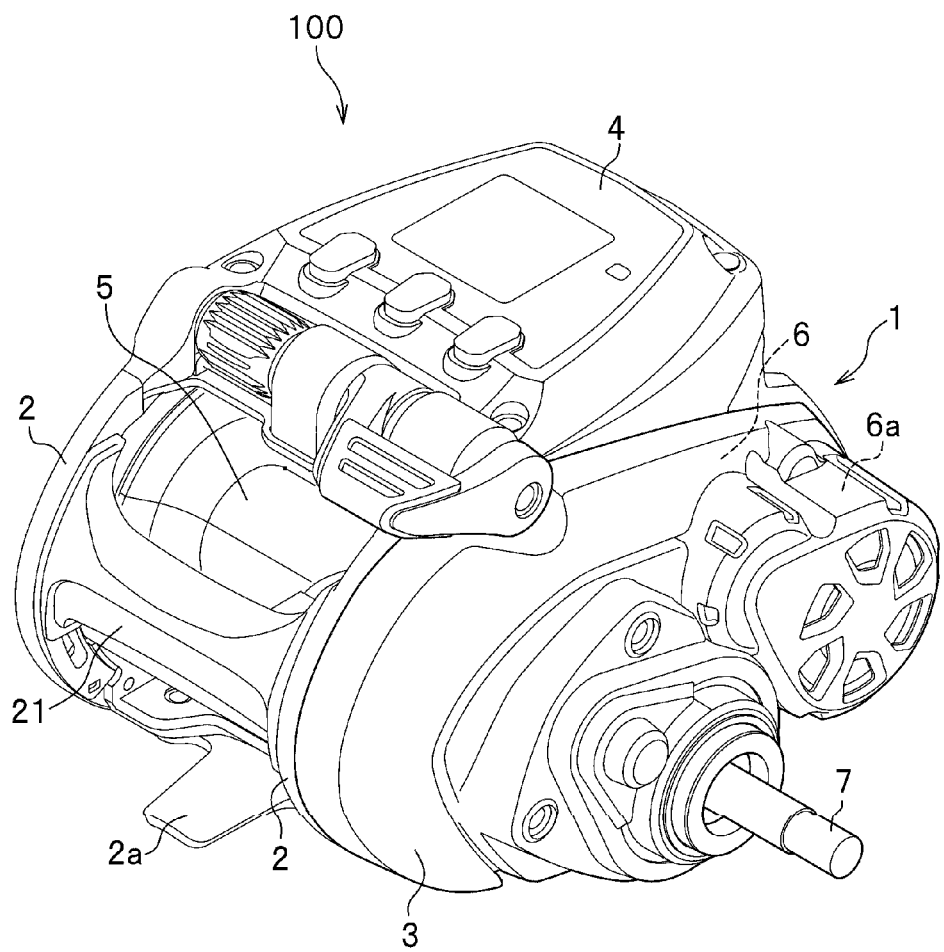
FIG. 1 is a perspective view illustrating a fishing electric reel according to a first embodiment of the present disclosure.
Figure 1:
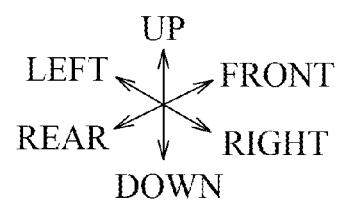

As illustrated in FIG. 1, a fishing electric reel 100 has a reel body 1 comprising left and right frames 2 and 2 and left and right side plates 3 and 3 (only a right side plate is illustrated) disposed to cover the left and right frames 2 and 2. A counter case 4 as a display unit is disposed in a front portion of a top surface of the reel body 1. The counter case 4 internally has a control unit that controls the operation of an electric motor 6.

The left and right frames 2 and 2 are portions forming a skeleton of the reel body 1, and are integrated into the left and right via a post. A reel leg 2a to be mounted on a reel seat of a fishing rod not illustrated in the drawings is provided in the lower post. The left and right frames 2 and 2 are formed of, for example, a metal material such as an aluminum alloy or a magnesium alloy.

A spool 5 around which a fishing line is wound is rotatably supported between the left and right frames 2 and 2. In front of the spool 5, the electric motor 6 is supported by the left and right frames 2 and 2.

The electric motor 6 comprises a drive shaft (not illustrated in the drawings) extending toward the left and right frames 2 and 2. A driving deceleration mechanism that decelerates a rotational driving force of the electric motor 6 and transmits the rotational driving force to the side of the spool 5 is connected to the drive shaft extending to the side of the left frame 2. In addition, a returning deceleration mechanism 6a that decelerates the rotational driving force of the electric motor 6 and transmits the rotational driving force to a second return mechanism 40 to be described later is connected to the drive shaft extending to the side of the right frame 2.

The left and right side plates 3 and 3 are portions gripped and held by a hand of a fisherman (portions which the hand of the fisherman contacts). The left and right side plates 3 and 3 are integrally formed individually and mounted on the left and right frames 2 and 2, respectively.

The right side plate 3 is provided with a handle shaft 7 to which a manual handle is attached. The spool 5 is rotationally driven in a fishing line winding direction via a driving force transmission mechanism by the driving force by the winding operation of the manual handle and the rotational driving force of the electric motor 6. The driving force transmission mechanism by the electric motor 6 is provided on the side of the left frame 2.

Figure 2:
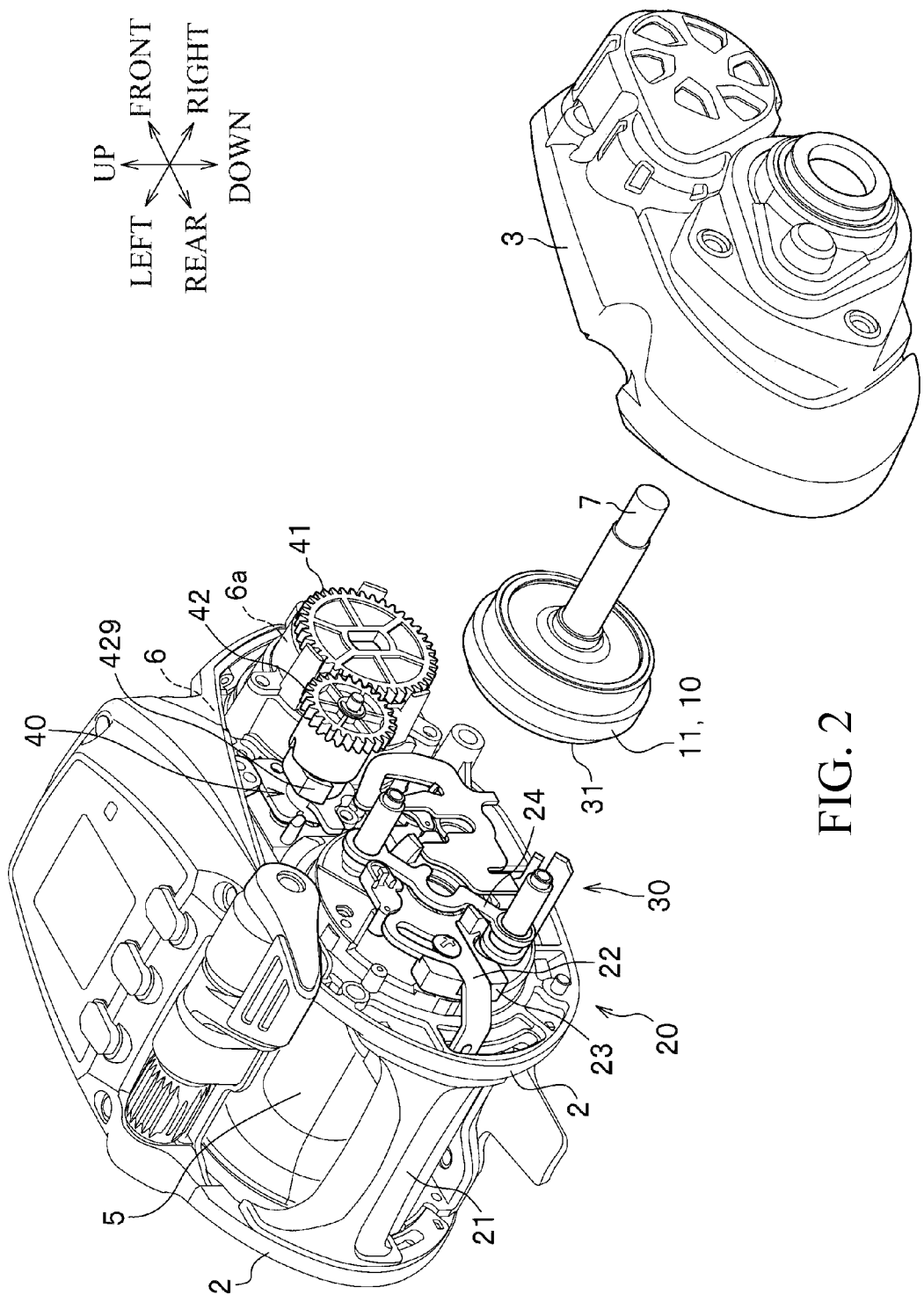
FIG. 2 is an exploded perspective view of a right side portion of the fishing electric reel.
Figure 3A:
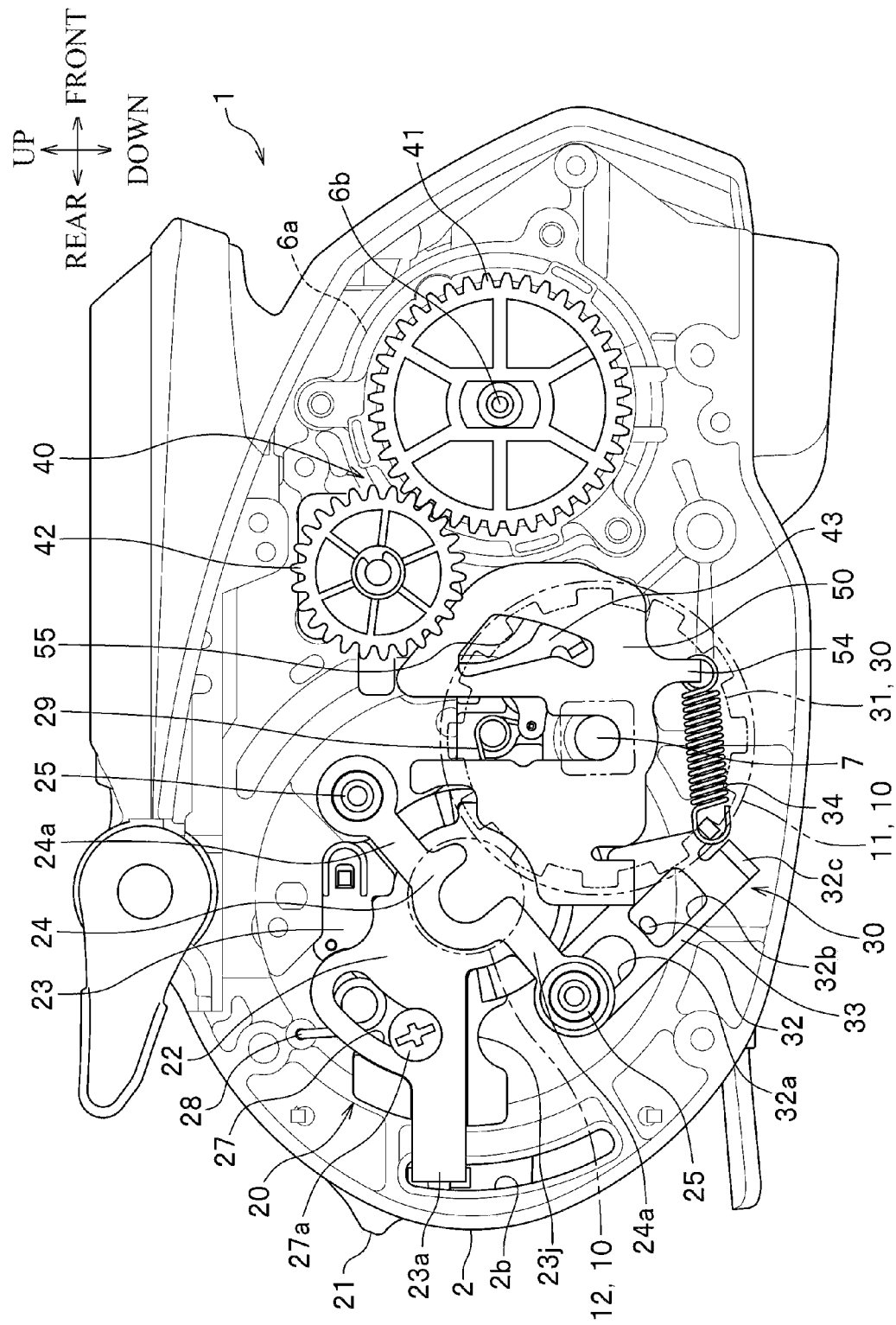
FIG. 3A is a right side view illustrating a positional relation of each component in a driving force transmission state.
Figure 3B:
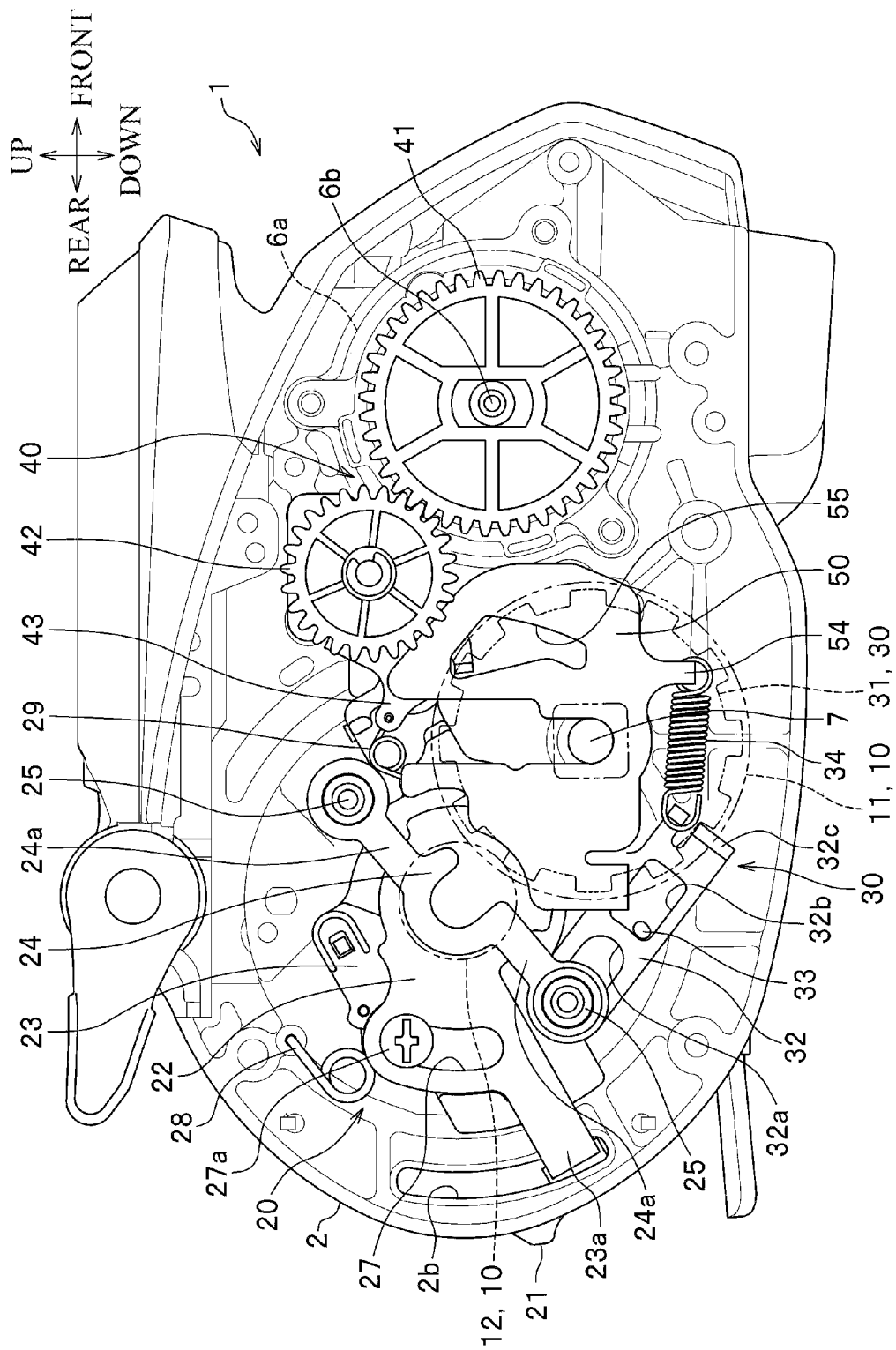
FIG. 3B is a right side view illustrating a positional relation of each component in a driving force interruption state.

As illustrated in FIGS. 2, 3A, and 3B, the right frame 2 is provided with a driving force transmission mechanism 10 that transmits the driving force by the manual handle to the spool 5, a clutch mechanism 20 that switches the spool 5 between a driving force transmission state and a driving force interruption state, and a return mechanism that causes the clutch mechanism 20 that has been brought into the driving force interruption state to return to the driving force transmission state. Among them, the return mechanism comprises a first return mechanism 30 that causes the clutch mechanism 20 to return to the driving force transmission state using the rotational driving force of the handle (handle shaft 7) and a second return mechanism 40 that causes the clutch mechanism 20 to return to the driving force transmission state using the rotational driving force of the electric motor 6. That is, the fishing electric reel 100 of the present embodiment comprises the two return mechanisms by the manual operation and the electric operation. Details of the first return mechanism 30 and the second return mechanism 40 will be described later.

As illustrated in FIG. 3A, the driving force transmission mechanism 10 comprises a drive gear 11 supported by the handle shaft 7 and a pinion 12 meshing with the drive gear 11. The drive gear 11 rotates integrally with the handle shaft 7, and transmits a driving force by the rotation operation of the manual handle to the pinion 12. The pinion 12 is provided on a pinion shaft (not illustrated in the drawings) rotatably supported by the right side plate 3 via a bearing. The pinion shaft extends coaxially with the spool shaft not illustrated in the drawings. A yoke 24 (to be described later) of the clutch mechanism 20 engages with the pinion 12. The pinion 12 is configured to be movable in an axial direction along the pinion shaft by an action (to be described later) of the yoke 24.

The pinion 12 has a fitting portion to be fitted into the spool shaft. When the pinion 12 is moved to the side of the spool 5 by the yoke 24, the pinion 12 is brought into a state where the fitting portion is fitted into the spool shaft so that the driving force of the drive gear 11 is transmitted to the spool shaft (spool 5) (driving force transmission state (fishing line windable state)). In addition, when the pinion 12 is moved to the side of the right side plate 3 by the yoke 24, the pinion 12 is brought into a state where the fitting portion disengages from the spool shaft so that the driving force of the drive gear 11 is not transmitted to the spool shaft (spool 5) (driving force interruption state (fishing line unwindable state)).

The clutch mechanism 20 comprises a clutch lever 21, a clutch frame 22, a clutch operating member 23, and a yoke 24. The clutch lever 21 is disposed between rear ends of the left and right frames 2 and 2 behind the spool 5 so as to be operable while thumbing the spool 5. The clutch lever 21 is a member that switches the clutch mechanism 20 from the driving force transmission state to the driving force interruption state by placing a thumb and pushing down.

The clutch frame 22 is a metal member that supports the clutch lever 21. The clutch frame 22 is fitted into a fitting recess 23b (see FIG. 4) formed on the right side surface of the clutch operating member 23, and is integrally attached to the clutch operating member 23. An arm 23a that supports the clutch lever 21 is provided at a rear end of the clutch frame 22. As illustrated in FIG. 3A, the arm 23a is movable in an up-down direction along a communication hole 2b formed at a rear end of the right frame 2.

The clutch operating member 23 is an annular rotator rotatable about the spool shaft (pinion shaft). The clutch operating member 23 is formed of a material having high strength and excellent wear resistance, for example, polyacetal (POM).

The clutch operating member 23 has a pair of cams 23k and 23k (see FIG. 4) engageable with the yoke 24. The cams 23k and 23k engage with/disengage from the yoke 24 along with the rotation of the clutch operating member 23, and move the yoke 24 along the pinion shaft.

As illustrated in FIG. 3B, a long hole 27 extending in a circumferential direction is formed in the rear portion of the clutch operating member 23. A boss portion (pin) (not illustrated in the drawings) protruding from the right frame 2 engages with the long hole 27, and engagement of the boss portion defines a rotation range of the clutch operating member 23. A screw member 27a is screwed into the boss portion from the right side of the clutch frame 22.

The clutch operating member 23 is elastically divided into the driving force transmission state, which is a clutch-on position, and the driving force interruption state, which is a clutch-off position, by a dividing spring member 28 interposed between the clutch operating member and the right frame 2. As the dividing spring member 28, a torsion spring is used.

The yoke 24 is a member that moves in a left-right direction along the pinion shaft in conjunction with the rotation operation of the clutch operating member 23. The yoke 24 has a pair of arms 24a and 24a that is fitted into a circumferential groove (not illustrated in the drawings) of the pinion 12 over approximately 180° and extends in a radial direction. The arms 24a and 24a of the yoke 24 are held by support pins 25 and 25 protruding from the right frame 2, and the yoke 24 is constantly biased toward the clutch operating member 23 by a spring member (not illustrated in the drawings) disposed on each of the support pins 25 and 25.

As described above, the first return mechanism 30 is a handle operation return mechanism that causes the clutch mechanism 20 to return to the driving force transmission state using the rotational driving force of the handle (handle shaft 7).

The first return mechanism 30 comprises a ratchet 31 and a first kick member 32 as a handle interlocking kick member. The ratchet 31 is fixed to the handle shaft 7 to prevent rotation, and rotates integrally with the handle shaft 7.

The first kick member 32 is disposed on the side surface of the right frame 2 below the pinion 12 (pinion shaft) in side view, and has a substantially rectangular plate shape. The first kick member 32 has a long hole 32a through which one support pin 25 is inserted, a rectangular restriction hole 32b through which a restriction projection 33 provided on the side surface of the right frame 2 is inserted, and an engagement portion 32c which engages with the ratchet 31. A coil spring 34 (see FIGS. 3A and 3B) that biases the engagement portion 32c toward the ratchet 31 is attached to a portion near the engagement portion 32c. Note that, in the following FIGS. 4 and 11A to 11E, the coil spring 34 is omitted for simplicity.

In the driving force transmission state illustrated in FIG. 3A, the first kick member 32 is pressed by the rotation of the clutch operating member 23, and is disposed at a position rotated clockwise about the support pin 25 as a fulcrum. As a result, in the driving force transmission state, the engagement portion 32c is disposed at a position separated from the ratchet 31.

On the other hand, when the first kick member 32 is switched from the driving force transmission state to the driving force interruption state, the engagement portion 32c moves into a rotational trajectory of the ratchet 31 as illustrated in FIG. 3B. As a result, when the handle is operated to rotate in the driving force interruption state, the first kick member 32 abuts on (is kicked by) the ratchet 31 and moves rearward and obliquely upward. With this movement, a distal end 32e of the first kick member 32 abuts on a recess 23j (see FIG. 4) of the clutch operating member 23, and the clutch operating member 23 is rotated in a clockwise direction. As a result, the clutch mechanism 20 is returned from the driving force interruption state to the driving force transmission state. Note that the return of the clutch mechanism 20 can also be performed by pushing up the clutch lever 21.

As described above, the second return mechanism 40 is a mechanism that causes the clutch mechanism 20 to return to the driving force transmission state using the rotational driving force of the electric motor 6.

As illustrated in FIG. 3A, the second return mechanism 40 comprises a returning gear 41, an engagement gear 42 functioning as a clutch returning rotator, and a second kick member 43. The engagement gear 42 and the second kick member 43 are disposed between the spool shaft (pinion shaft) and an output shaft 6b (see FIG. 3A; motor shaft) of the returning deceleration mechanism 6a. Here, the second return mechanism 40 is driven by the control of a control unit 60 as a control unit illustrated in FIG. 13.

Figure 13:
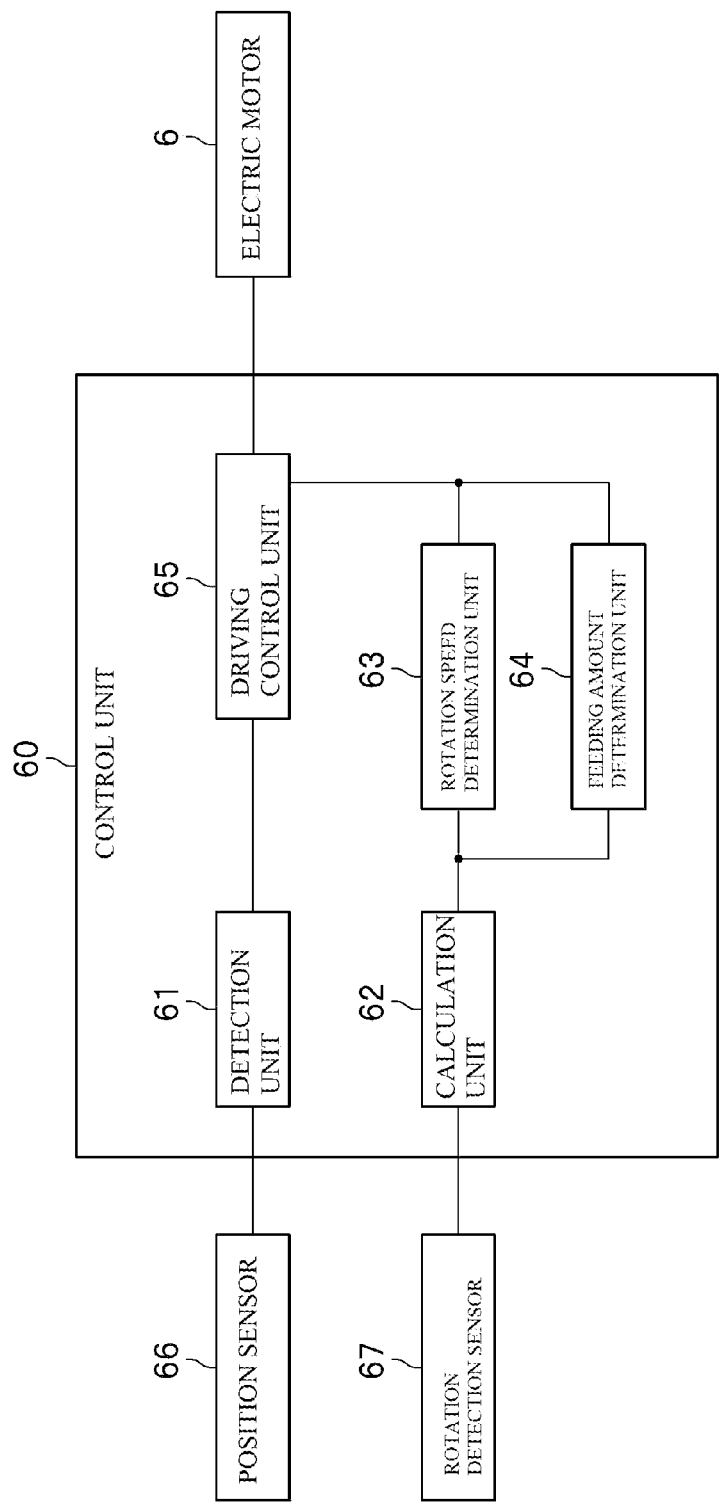
FIG. 13 is a block diagram illustrating a control unit.

As illustrated in FIG. 13, the control unit 60 comprises a detection unit 61, a calculation unit 62, a rotation speed determination unit 63, a feeding amount determination unit 64, and a driving control unit 65.

When the clutch mechanism 20 is in the driving force interruption state, the detection unit 61 detects this. A position sensor 66 that detects the position of the clutch operating member 23 is connected to the detection unit 61. When a detection signal is input from the position sensor 66, the detection unit 61 detects that the clutch mechanism 20 is in the driving force interruption state, and outputs the detection signal to the driving control unit 65. The position sensor 66 can include, for example, a magnetic sensor provided on the side of the right frame 2 and a magnet provided on the side of the clutch operating member 23.

The calculation unit 62 calculates a rotation speed of the spool 5 associated with feeding of the fishing line and calculates a feeding amount of the fishing line. A rotation detection sensor 67 that detects the rotation of the spool 5 is connected to the calculation unit 62. The calculation unit 62 calculates the rotation speed of the spool 5 based on a rotation signal of the spool 5 input from the rotation detection sensor 67, and outputs a calculated value to the rotation speed determination unit 63. In addition, the calculation unit 62 calculates the feeding amount of the fishing line based on the calculated rotation speed of the spool 5, and outputs a calculated value to the feeding amount determination unit 64.

The rotation speed determination unit 63 determines whether or not the value of the rotation speed of the spool 5 calculated by the calculation unit 62 satisfies a predetermined condition set in advance. When it is determined that the value of the rotation speed of the spool 5 satisfies the predetermined condition set in advance, the rotation speed determination unit 63 outputs a determination result to the driving control unit 65. Note that the predetermined condition at the rotation speed of the spool 5 can be appropriately set by selecting a function included The feeding amount determination unit 64 determines whether or not the feeding amount of the fishing line calculated by the calculation unit 62 has reached a preset feeding amount of the fishing line. When it is determined that a calculated value of the feeding amount of the fishing line has reached the preset feeding amount of the fishing line, the feeding amount determination unit 64 outputs a determination result to the driving control unit 65. Note that the setting of the feeding amount of the fishing line (for example, setting for stopping the rotation of the spool 5 and stopping a fishing tackle at a predetermined shelf (water depth) and the like) can be appropriately performed by selecting a function provided in the counter case 4 (see FIG. 1).

The driving control unit 65 controls driving of the electric motor 6 in a forward rotation direction or a reverse rotation direction. When it is determined by the detection unit 61 that the clutch mechanism 20 is in the driving force interruption state and it is determined by the rotation speed determination unit 63 that the rotation speed of the spool 5 satisfies the predetermined condition, or when it is determined by the feeding amount determination unit 64 that the feeding amount of the fishing line has reached the preset feeding amount of the fishing line, the driving control unit 65 controls driving of the electric motor 6 in the reverse rotation direction. That is, the driving control unit 65 has a return control function of returning the clutch mechanism 20 from the driving force interruption state to the driving force transmission state, in addition to the normal winding control.

Next, each component of the second return mechanism 40 will be described in detail.

As illustrated in FIGS. 3A and 3B, the returning gear 41 of the second return mechanism 40 is attached to the output shaft 6b of the returning deceleration mechanism 6a connected to the electric motor 6, and rotates in the clockwise direction when the electric motor 6 is driven in the reverse rotation by the driving control of the control unit 60. Note that the returning gear 41 does not rotate in the counterclockwise direction by the returning deceleration mechanism 6a or a one-way clutch incorporated in a configuration different from that of the returning deceleration mechanism 6a.

The engagement gear 42 meshes with the returning gear 41, and receives the rotational driving force of the returning gear 41 to push the second kick member 43 downward (return from the driving force interruption state to the driving force transmission state). The second kick member 43 is a member for returning the clutch operating member 23 brought into the driving force interruption state to the driving force transmission state. The second kick member 43 is configured to engage with/disengage from the engagement gear 42 by rotating in conjunction with the rotation of the clutch operating member 23. The second kick member 43 is retained by a fixing plate 50 for fixing the handle shaft 7 to the right frame 2. The second kick member 43 is formed of a stainless steel material having strength and excellent wear resistance.

Figure 5A:
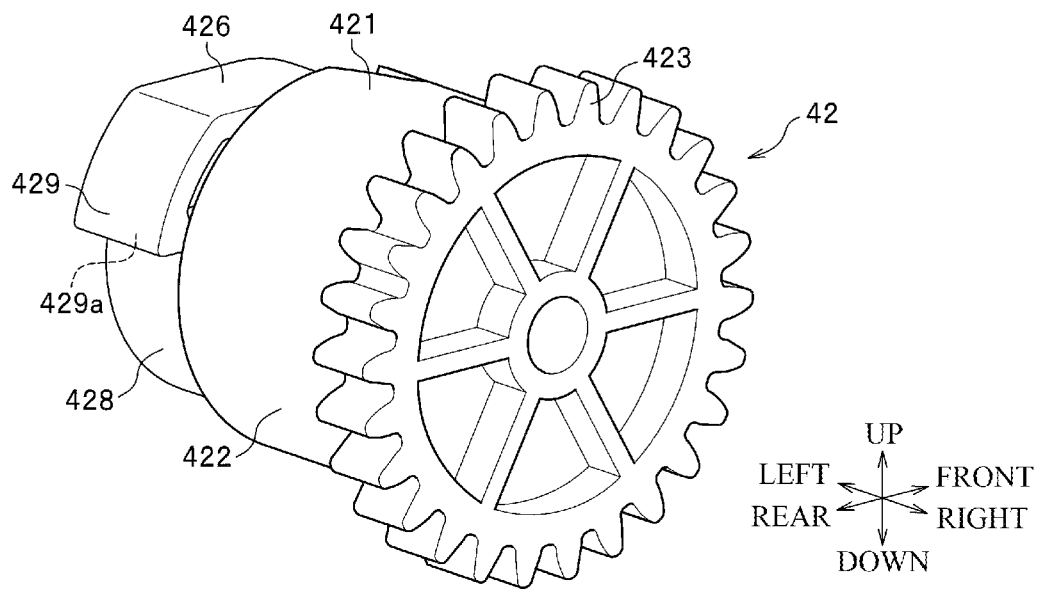
FIG. 5A is an enlarged perspective view illustrating an engagement gear.

As illustrated in FIG. 5A, the engagement gear 42 comprises a gear body 421 and a claw portion 426 rotatably assembled to the gear body 421.

Figure 5B:
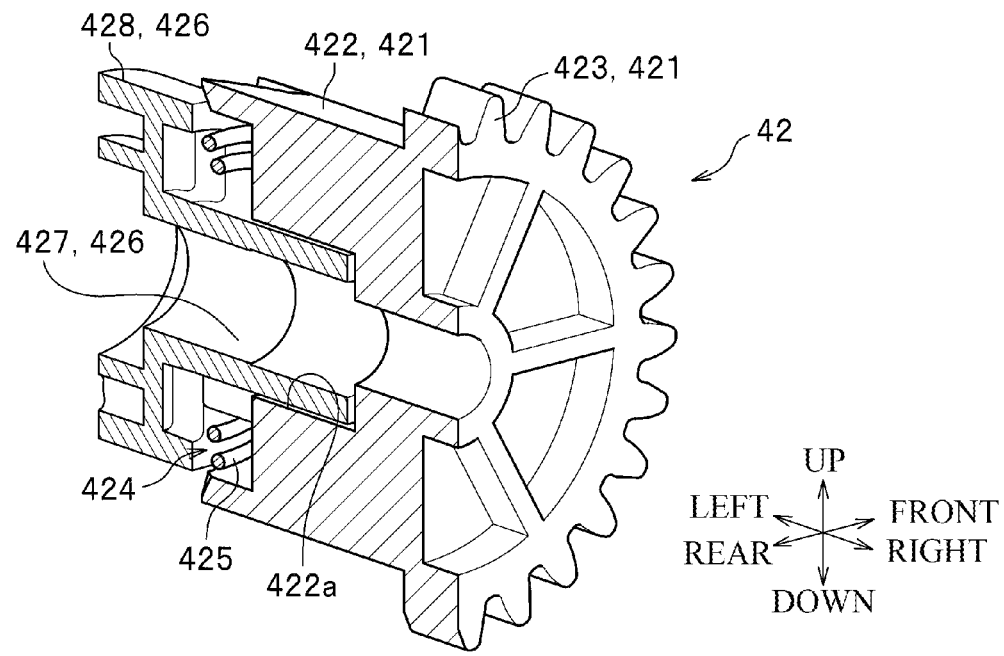
FIG. 5B is a longitudinal cross-sectional view illustrating a cross section along an axial direction of the engagement gear.
Figure 5C:
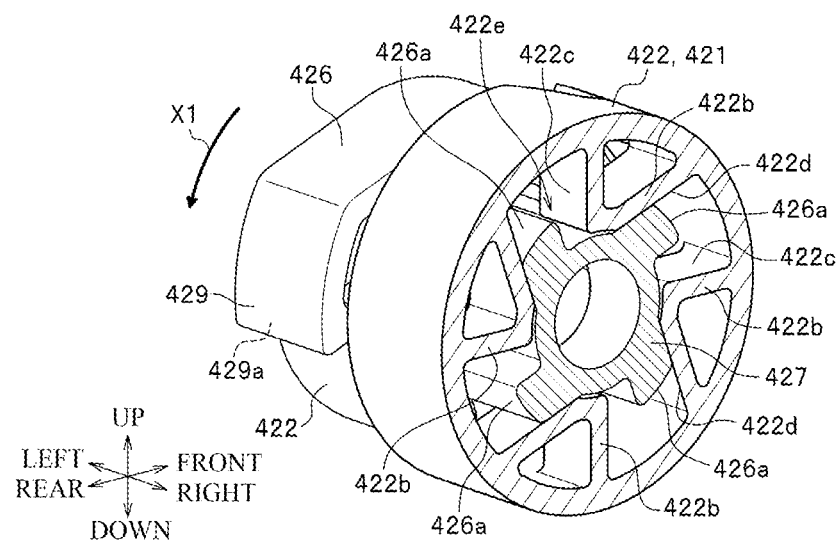
FIG. 5C is a longitudinal cross-sectional view illustrating a cross section of a main part along a radial direction of the engagement gear.

As illustrated in FIGS. 5A and 5B, the gear body 421 comprises a cylindrical base portion 422 and a tooth portion 423 integrally formed on a right side portion of the base portion 422. The base portion 422 is fixed to the output shaft 6b (see FIG. 3A) of the returning deceleration mechanism 6a to prevent rotation. As illustrated in FIG. 5B, a stepped cylindrical inner surface portion 422a into which an insertion portion 427 of the claw portion 426 is inserted is formed inside the base portion 422. As illustrated in FIG. 5C, a protrusion portion 422b protruding radially inward is formed inside the base portion 422. The protrusion portion 422b has a substantially triangular cross section, and a total of four protrusion portions are formed at intervals of 90 degrees in a circumferential direction of the inner surface of the base portion 422. A rotation space portion 422e for securing the rotation of the claw portion 426 is formed between the adjacent protrusion portions 422b. Each of the protrusion portions 422b comprises a right angle surface 422c extending in the axial direction and an inclined surface 422d extending in the axial direction, and rotatably supports the insertion portion 427 of the claw portion 426 at each vertex portion.

As illustrated in FIG. 5B, the claw portion 426 comprises a cylindrical insertion portion 427 to be inserted into the inner surface portion 422a of the base portion 422, and a substantially cylindrical large diameter portion 428 continuous with the left side of the insertion portion 427. A gap portion 424 is formed between the right side portion of the large diameter portion 428 and the left side portion of the base portion 422 facing the right side portion, and a spring member 425 is disposed. The spring member 425 functions as a biasing member that biases the claw portion 426 in the counterclockwise direction (direction of an arrow X1 in FIG. 5C) with respect to the base portion 422. On an outer peripheral surface of the large diameter portion 428, two engagement claws 429 and 429 (only one is illustrated) are formed to protrude at intervals of 180 degrees in the circumferential direction. Each engagement claw 429 comprises an engagement surface 429a rising substantially at a right angle in the radial direction (see FIG. 12).

Figure 5D:
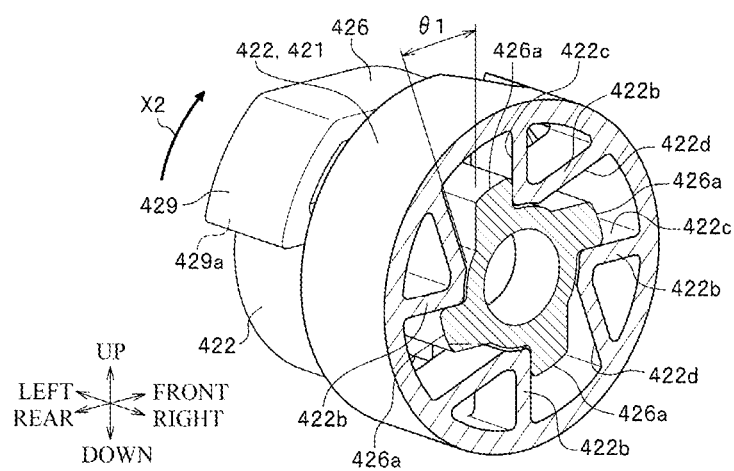
FIG. 5D is an explanatory view illustrating a rotation range of a claw portion in the engagement gear.

As illustrated in FIG. 5C, a restriction protrusion portion 426a protruding outward in the radial direction is formed on the outer peripheral surface of the insertion portion 427 of the claw portion 426. The restriction protrusion portion 426a has a substantially quadrangular cross section, and a total of four restriction protrusion portions are formed at intervals of 90 degrees in the circumferential direction of the outer peripheral surface of the insertion portion 427. Each restriction protrusion portion 426a is disposed in each rotation space portion 422e of the base portion 422, and is rotatable in the clockwise direction (see an arrow X2 in FIG. 5D) against the biasing force of the spring member 425 within a range partitioned in the circumferential direction by the right angle surface 422c and the inclined surface 422d of the adjacent protrusion portions 422b and 422b (within a range of the size in the circumferential direction of the rotation space portion 422e). That is, the engagement claw 429 of the claw portion 426 is configured to take a first position (a position illustrated in FIG. 5C) moved in the rotation direction of the engagement gear 42 and a second position (a position illustrated in FIG. 5D) moved in the opposite direction, and is configured to be biased from the second position toward the first position by the biasing force of the spring member 425. As illustrated in FIG. 5D, a rotation angle of each restriction protrusion portion 426a is expressed by an angle θ1 defined by the inclined surface 422d and the facing surface of the restriction protrusion portion 426a facing the inclined surface. The angle θ1 is set to a size that allows a sliding distance L1 (see FIG. 12) to be described later when the second kick member 43 abuts on the large diameter portion 428 of the engagement gear 42.

Figure 8A:
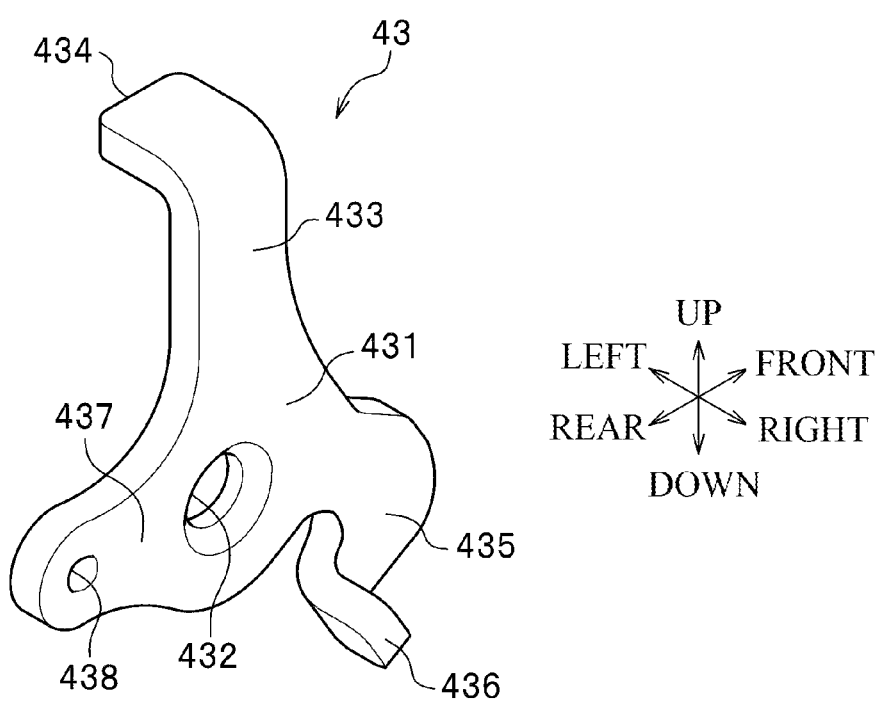
FIG. 8A is a perspective view illustrating a second kick member.
Figure 8B:
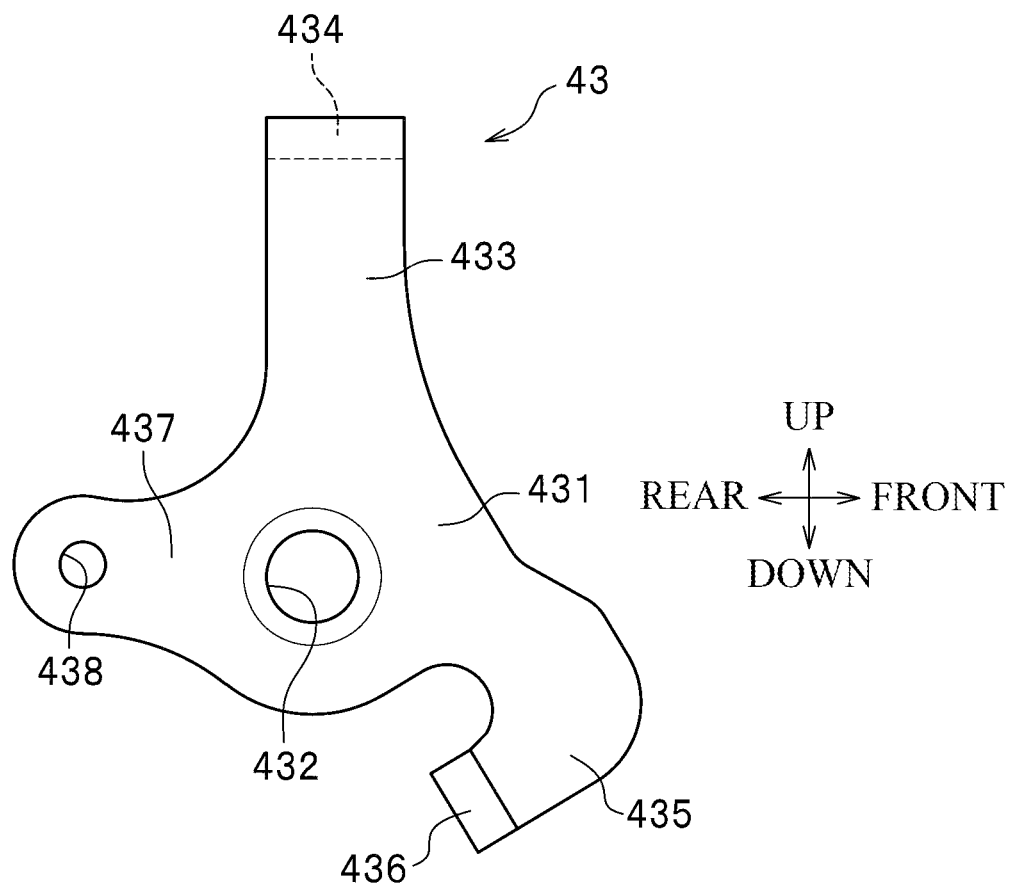
FIG. 8B is a side view illustrating the second kick member.

As illustrated in FIGS. 8A and 8B, the second kick member 43 comprises a rotation support portion 431, a spring locking portion 437 extending rearward from the rotation support portion 431, an engagement protrusion portion 433 extending upward from the rotation support portion 431, and a guide portion 435 extending forward and downward from the rotation support portion 431.

A support hole 432 through which a rotation support shaft 23d (see FIG. 7) of the clutch operating member 23 is inserted is formed in a center portion of the rotation support portion 431. A locking hole 438 is formed at a rear end of the spring locking portion 437. The engagement protrusion portion 433 is a portion that abuts on the engagement claw 429 of the engagement gear 42, and comprises an abutting portion 434 at a distal end. The abutting portion 434 is formed by bending an upper end of the engagement protrusion portion 433 leftward at a substantially right angle. As illustrated in FIG. 8B, the abutting portion 434 is disposed slightly forward with respect to the support hole 432 in side view. The guide portion 435 is curved in a substantially U shape in side view and has a distal end facing rearward and downward. A guide protrusion portion 436 is provided at the distal end of the guide portion 435. The guide protrusion portion 436 is formed by bending the distal end of the guide portion 435 rightward at a substantially right angle.

Figure 4:
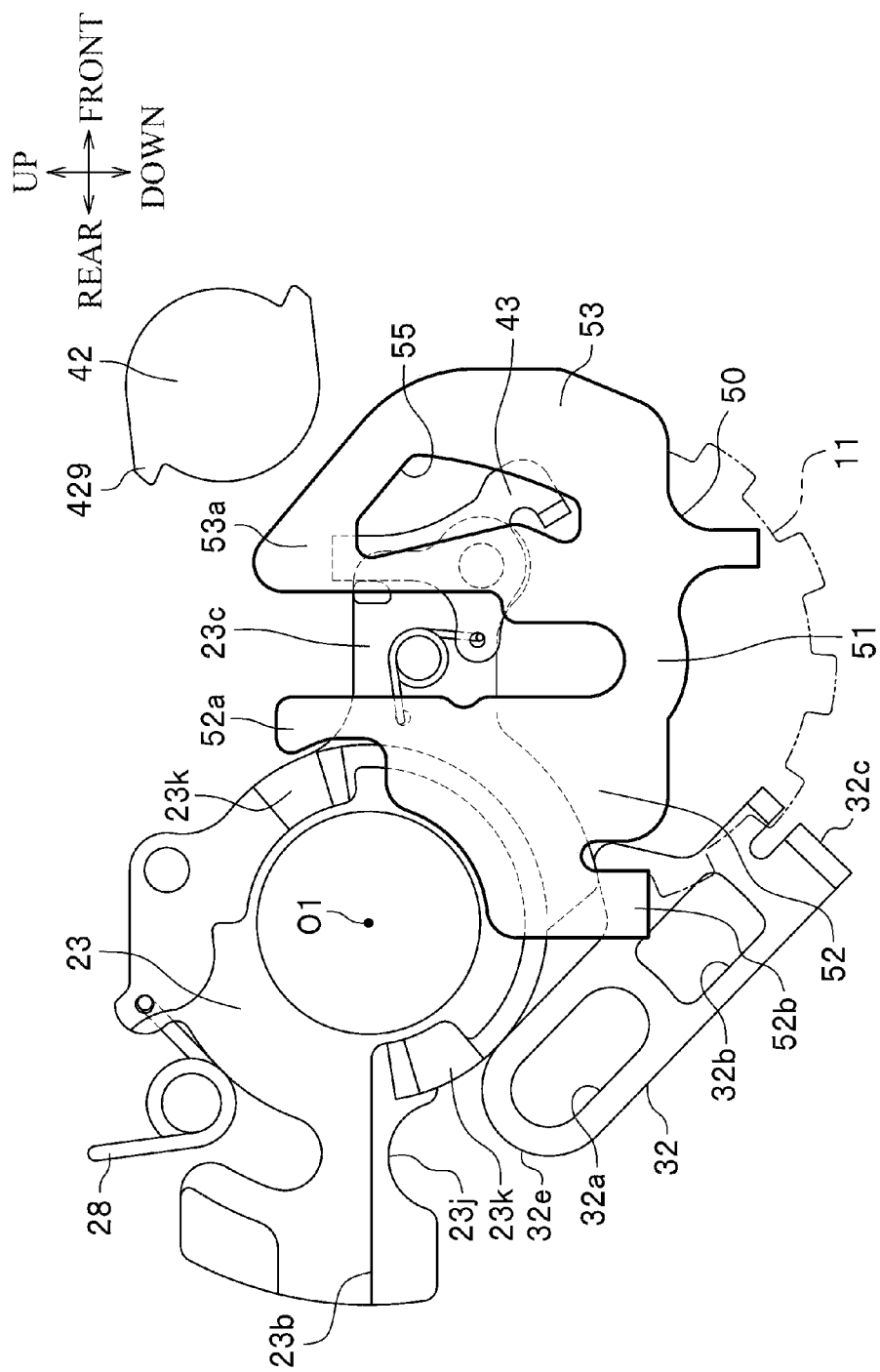
FIG. 4 is an explanatory view illustrating a positional relation between a guide protrusion portion and a guide hole of a second kick member in the driving force transmission state.
Figure 7:
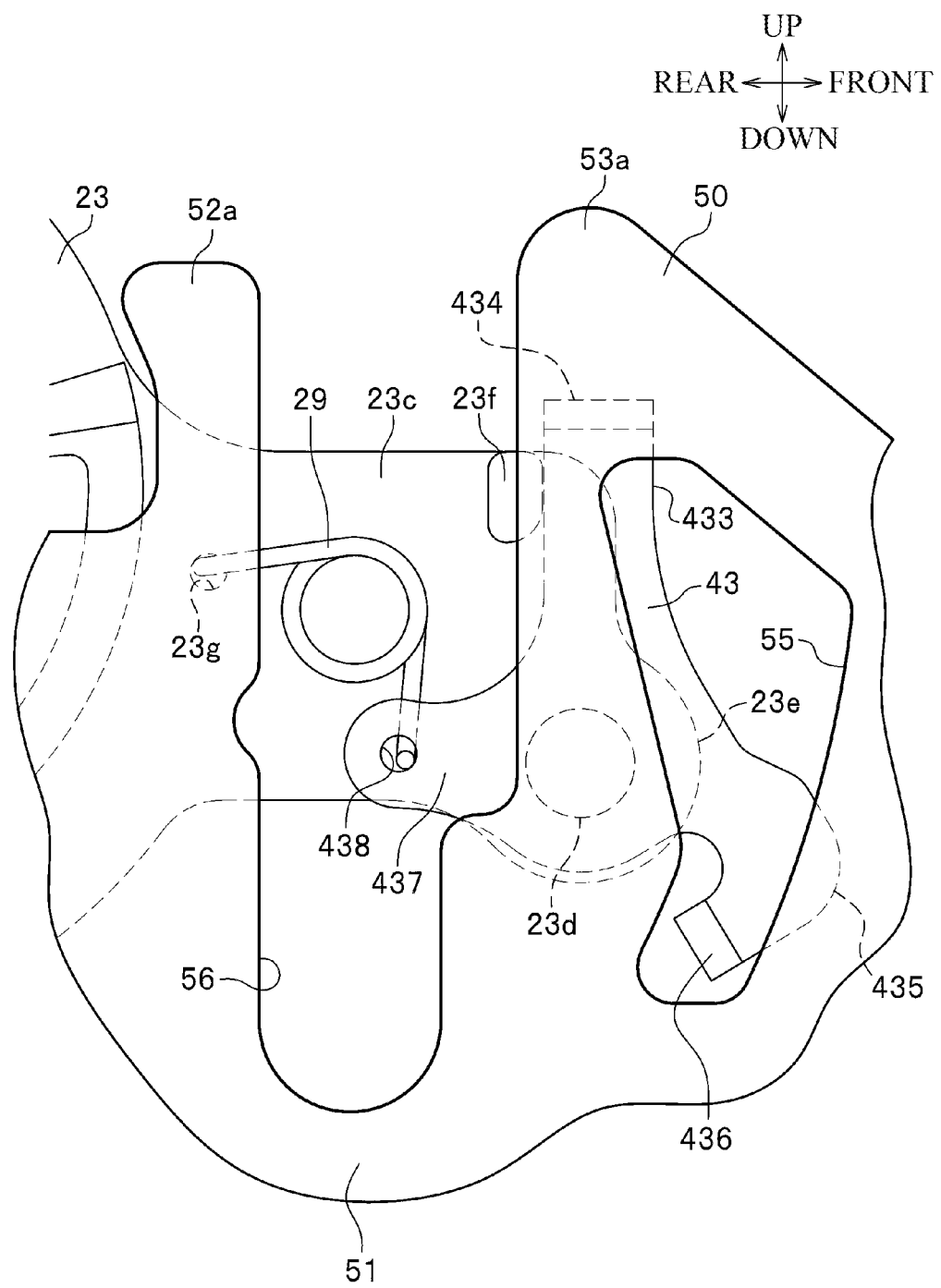
FIG. 7 is an enlarged side view illustrating a structure around a front end of a clutch operating member.

As illustrated in FIG. 4, the second kick member 43 is attached to a front end 23c of the clutch operating member 23. As illustrated in FIG. 7, the front end 23c has a substantially quadrangular flat plate shape in side view, and extends toward the front of the clutch operating member 23. An attachment seat 23e on which the second kick member 43 is disposed is formed at a lower front portion of the front end 23c. The outer contour of the attachment seat 23e is formed in a circular shape corresponding to the circular shape of the rotation support portion 431 of the second kick member 43. In the attachment seat 23e, the rotation support shaft 23d that is inserted into the support hole 432 of the second kick member 43 protrudes.

On the other hand, a holding protrusion portion 23f that holds the second kick member 43 in an upright posture (a posture in which the abutting portion 434 faces directly upward) is formed at an upper front portion of the front end 23c. The holding protrusion portion 23f protrudes toward the right side of the front end 23c, and abuts on the rear portion of the engagement protrusion portion 433 of the second kick member 43 to hold the posture of the second kick member 43.

A locking hole 23g is formed in a rear portion of the front end 23c. A rear end of the spring member 29 connected to the second kick member 43 is locked to the locking hole 23g. The rear end of the spring member 29 is inserted into the locking hole 23g from the right side, and is covered with an upper portion 52a of the rear portion 52 of the fixing plate 50 from the right side to be retained.

The spring member 29 functions as a dividing spring that elastically divides the engagement/disengagement of the second kick member 43 with respect to the engagement gear 42. In the present embodiment, a torsion spring is used as the spring member 29. In the driving force transmission state of the clutch mechanism 20, the second kick member 43 is divided and held in a non-engagement state in which the engagement protrusion portion 433 abuts on the holding protrusion portion 23f, by the spring member 29. In addition, in the driving force interruption state of the clutch mechanism 20, the second kick member 43 is divided and held in an engagement state in which the second kick member 43 abuts on the claw portion 426 of the engagement gear 42 and can engage with the engagement claw 429, by the spring member 29.

As described above, the fixing plate 50 mainly has two functions of a function of fixing the handle shaft 7 to the right frame 2 and a function of retaining the second kick member 43. The fixing plate 50 covers a part of the front side of the clutch operating member 23, and also has a function of holding the front side of the clutch operating member 23. Similarly to the second kick member 43, the fixing plate 50 is formed of a stainless steel material having strength and excellent wear resistance.

Figure 6A:
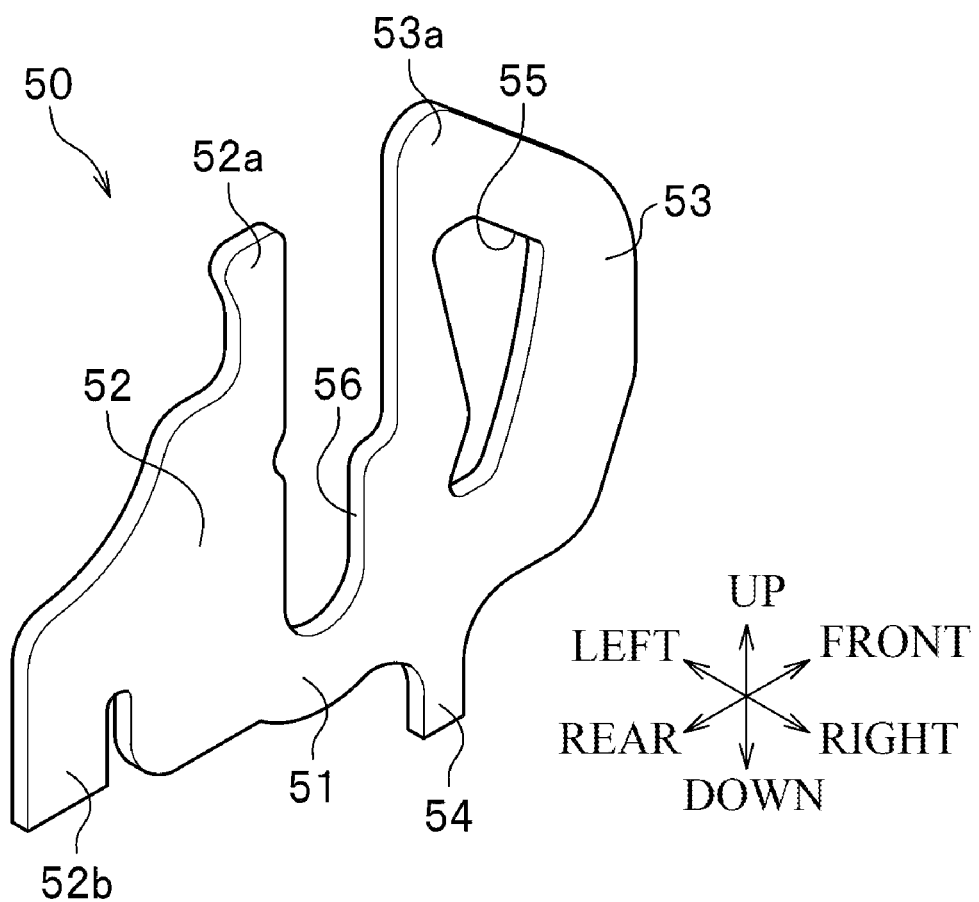
FIG. 6A is a perspective view illustrating a fixing plate.
Figure 6B:
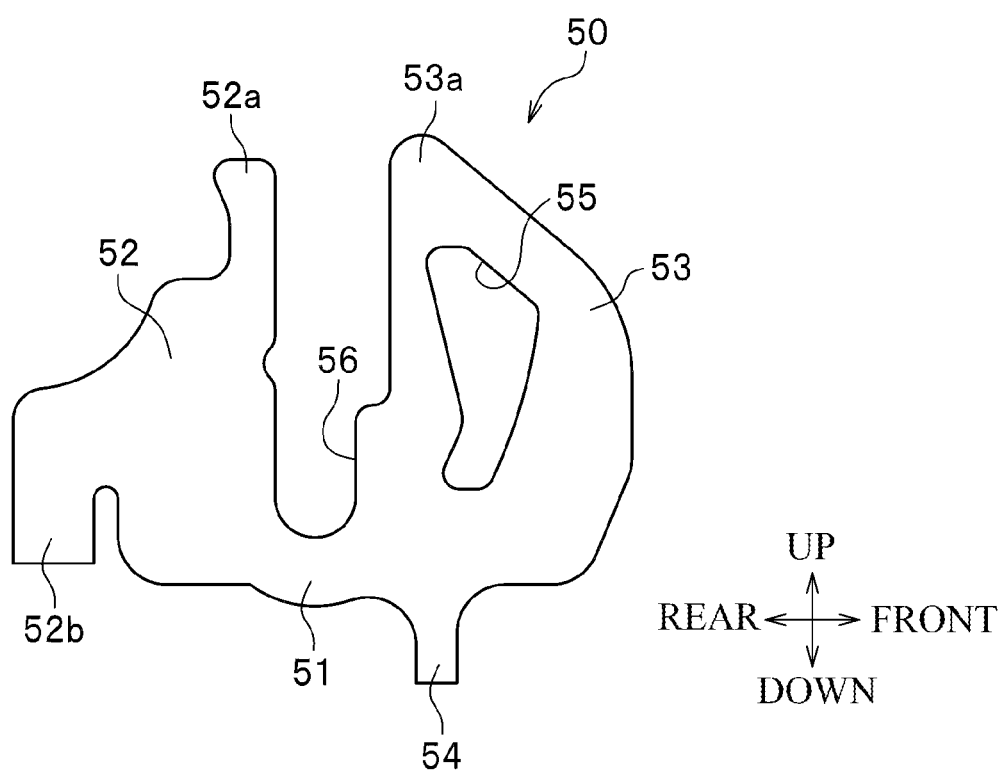
FIG. 6B is a side view illustrating the fixing plate.

As illustrated in FIGS. 6A and 6B, the fixing plate 50 comprises a center portion 51, a rear portion 52 continuous with the rear side of the center portion 51, and a front portion 53 continuous with the front side of the center portion 51. A groove 56 extending in the up-down direction and having a substantially U-shape in side view is formed between the rear portion 52 and the front portion 53. The handle shaft 7 is inserted into the fixing plate 50 through a lower end of the groove 56 and attached to the right frame 2 (see FIG. 2).

Figure 10:
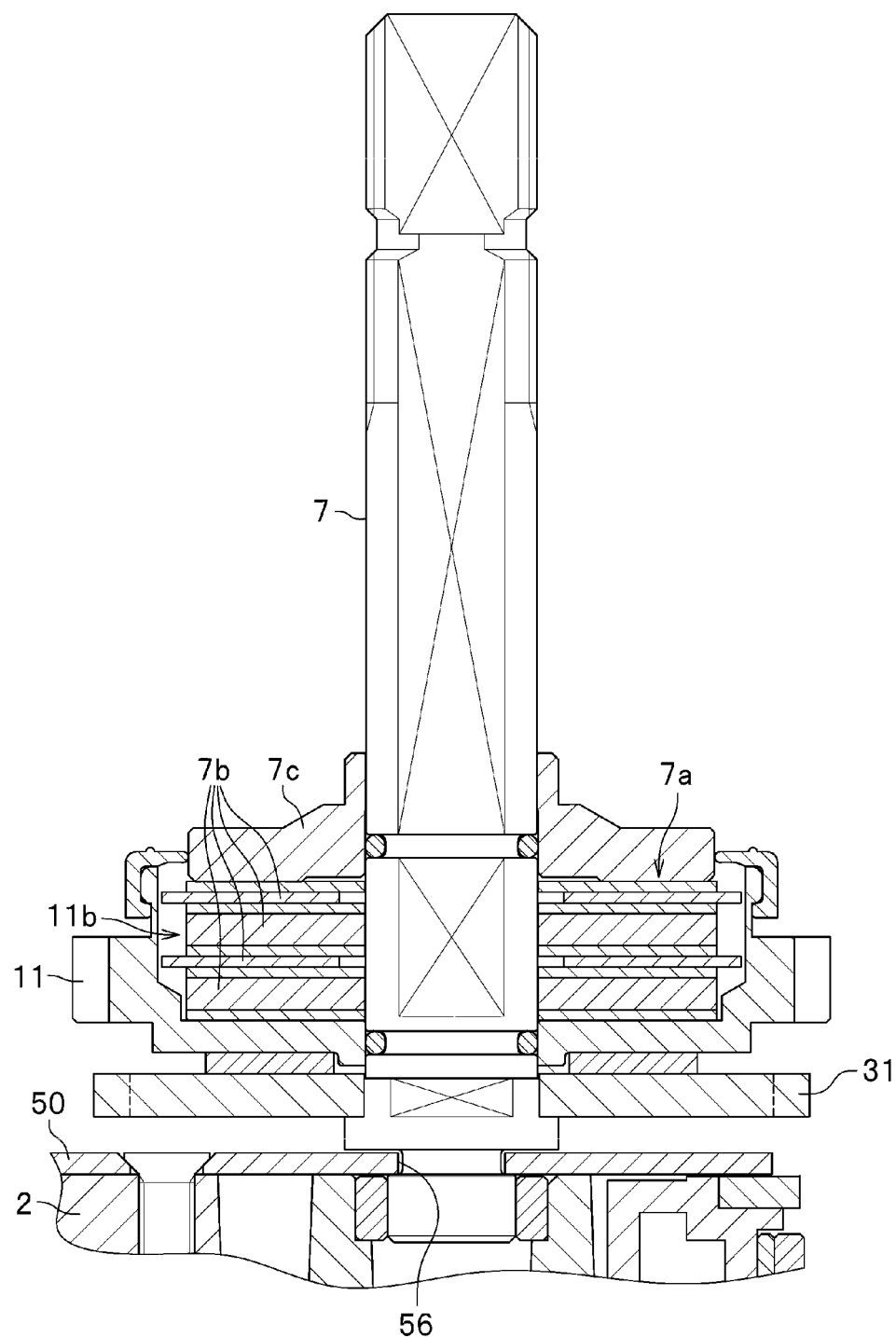
FIG. 10 is a cross-sectional view illustrating a support structure of a handle shaft with respect to the fixing plate.

Here, the handle shaft 7 is provided with a one-way clutch (not illustrated in the drawings) and a known drag mechanism 7a illustrated in FIG. 10. The drag mechanism 7a applies a drag force to the rotation of the spool 5 when the fishing line is fed out from the spool 5 during fishing. Note that a star-shaped drag adjustment knob (star drag) for adjusting the drag force by the drag mechanism 7a is provided between the reel body 1 and the handle. The drag mechanism 7a comprises a plurality of braking members (friction plate, washer, and the like) 7b disposed in a recess 11b of the drive gear 11. The drag mechanism 7a has a function of adjusting a pressing force of a pressing member 7c with respect to the braking member 7b and adjusting a rotational friction force (drag force) of the drive gear 11 with the handle shaft 7 by rotationally operating the drag adjustment knob.

As illustrated in FIGS. 4 and 6A and 6B, the rear portion 52 of the fixing plate 50 covers a part of the front portion of the clutch operating member 23, and rotatably holds the front portion of the clutch operating member 23. The upper portion 52a of the rear portion 52 extends upward so as to cover the locking hole 23g of the front end 23c of the clutch operating member 23, and retains the rear end of the spring member 29 over the entire rotation of the clutch operating member 23. An extension portion 52b extending rearward is formed in a lower portion of the rear portion 52. As illustrated in FIG. 4, the extension portion 52b extends so as to cover a part of the first kick member 32, and abuts on the first kick member 32 from the right side to support the first kick member 32.

As illustrated in FIGS. 4 and 6A and 6B, the front portion 53 of the fixing plate 50 faces the rear portion 52 with the groove 56 interposed therebetween, and comprises a substantially triangular guide hole 55 opened in the up-down direction. The guide hole 55 functions as a restriction hole that restricts the rotation position of the second kick member 43 with respect to the engagement claw 429 of the engagement gear 42. The guide protrusion portion 436 of the second kick member 43 is inserted into the guide hole 55. The upper portion 53a of the front portion 53 holds the rotation support shaft 23d (the rotation support portion 431 of the second kick member 43) over the entire movement of the second kick member 43 associated with the rotation of the clutch operating member 23.

An attachment portion 54 to which the front end of the coil spring 34 (see FIG. 3A) is attached is provided at the lower portion of the front portion 53.

Figure 9:
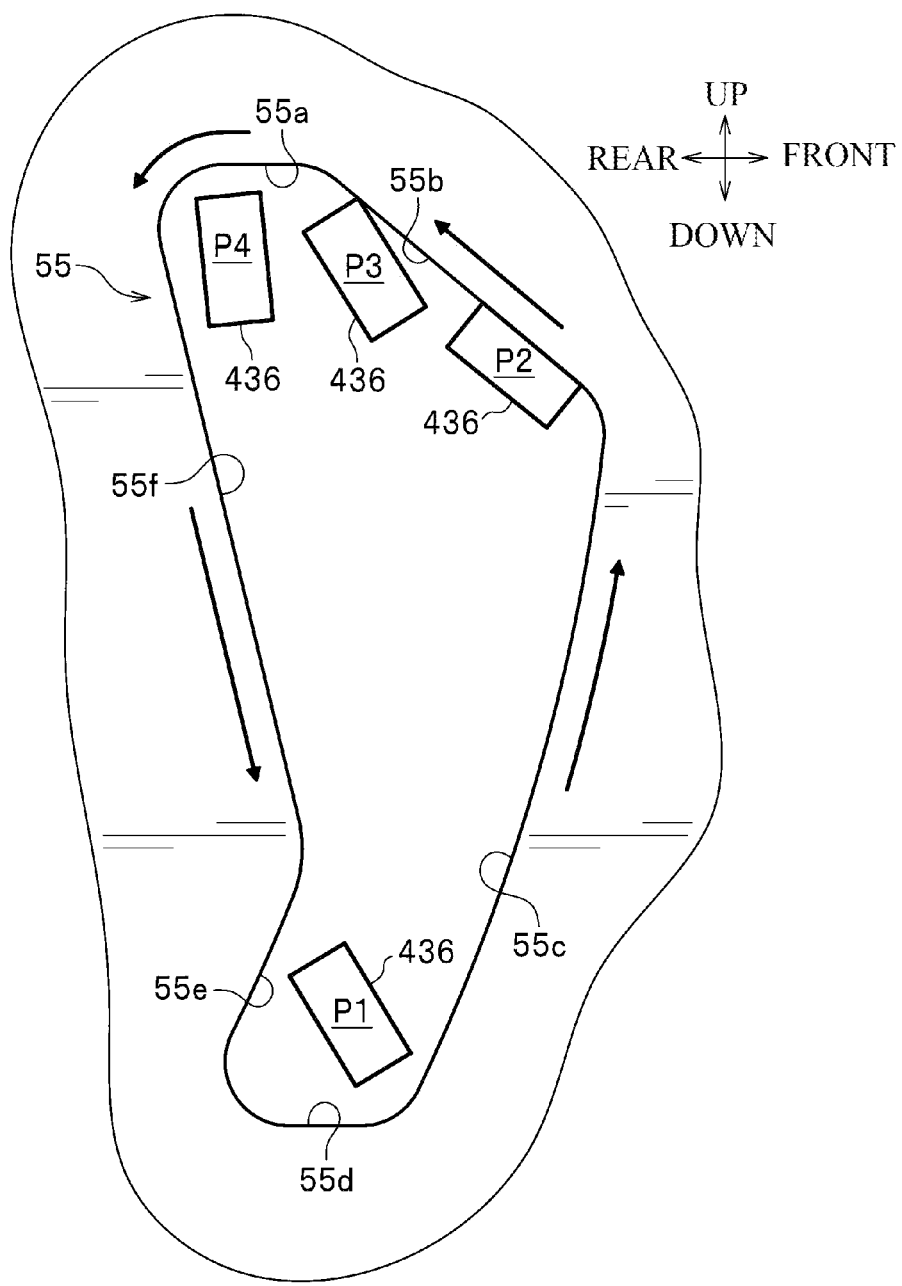
FIG. 9 is an enlarged explanatory view illustrating a positional relation of guide protrusion portions in the guide hole.

As illustrated in FIG. 9, the guide hole 55 comprises an upper edge portion 55a, a front upper edge portion 55b continuous with the front side of the upper edge portion 55a, a front lower edge portion 55c continuous with the lower side of the front upper edge portion 55b, a lower edge portion 55d continuous with the lower side of the front lower edge portion 55c, a rear lower edge portion 55e continuous with the rear side of the lower edge portion 55d, and a rear upper edge portion 55f continuous with the upper side of the rear lower edge portion 55e and connected to the rear side of the upper edge portion 55a. The upper edge portion 55a and the lower edge portion 55d are substantially parallel to each other. The front upper edge portion 55b is inclined forward and downward from a front end of the upper edge portion 55a. The front lower edge portion 55c is inclined rearward and downward from a lower end of the front upper edge portion 55b, and is entirely recessed forward in a gentle arc shape. The rear lower edge portion 55e is inclined forward and upward from a rear end of the lower edge portion 55d. The rear upper edge portion 55f is inclined rearward and upward from an upper end of the rear lower edge portion 55e and is connected to a rear end of the upper edge portion 55a.

Next, a positional relation between the guide protrusion portion 436 of the second kick member 43 and each edge portion of the guide hole 55 will be described with reference to FIGS. 4 and 11A to 11E while referring to FIG. 9.

As illustrated in FIG. 4, when the clutch mechanism 20 is in the clutch-on position (driving force transmission state), as illustrated in FIG. 9, the guide protrusion portion 436 is disposed at a first position P1 which is a lower region of the guide hole 55 and is in a region surrounded by the front lower edge portion 55c, the lower edge portion 55d, and the rear lower edge portion 55e.

Figure 11A:
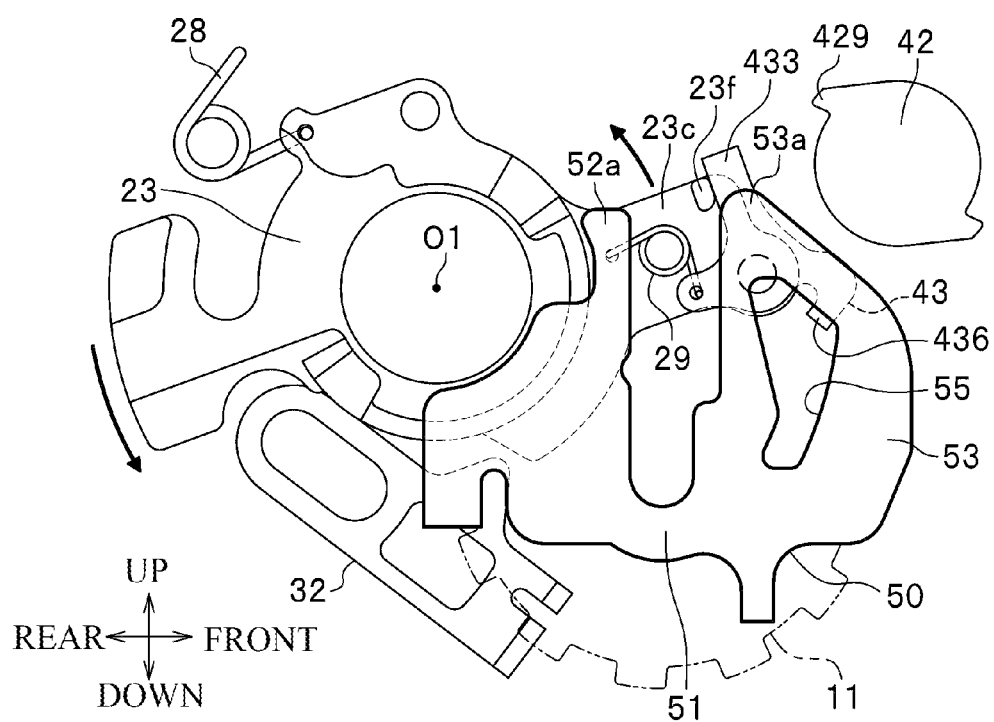
FIG. 11A is an explanatory view illustrating a positional relation of the second kick member when a clutch lever is pushed down from the driving force transmission state.

As illustrated in FIG. 11A, when the clutch lever 21 of the clutch mechanism 20 is pushed down with the fingers from this state, the clutch operating member 23 rotates in the counterclockwise direction about a rotation axis O1, and the second kick member 43 moves upward from the position in FIG. 4. At this time, as illustrated in FIG. 9, the guide protrusion portion 436 of the second kick member 43 moves upward along the front lower edge portion 55c from the lower end position of the front lower edge portion 55c of the guide hole 55, and moves to a second position P2 in contact with the vicinity of the lower end of the front upper edge portion 55b. Note that the engagement protrusion portion 433 of the second kick member 43 remains in contact with the holding protrusion portion 23f of the front end 23c of the clutch operating member 23.

Figure 11B:
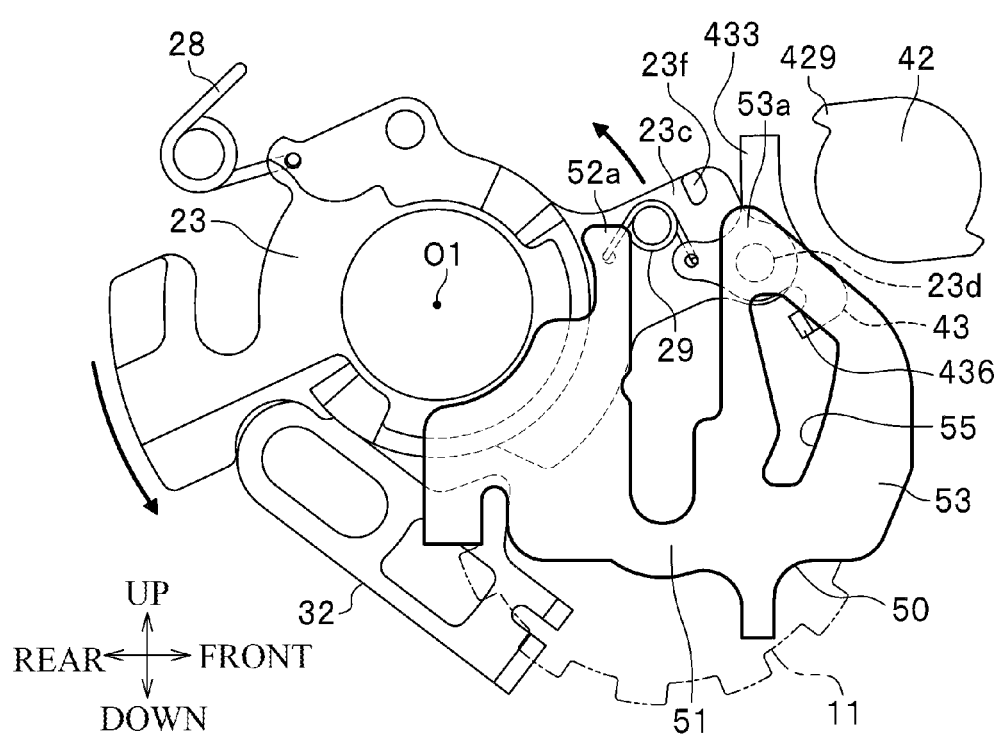
FIG. 11B is an explanatory view illustrating a positional relation of the second kick member when the clutch lever is further pushed down from the state in FIG. 11A and the engagement protrusion portion of the second kick member rises.

Then, when the clutch lever 21 is continuously pushed down, as illustrated in FIG. 11B, the clutch mechanism 20 rotates in the counterclockwise direction beyond a dead point of the dividing spring member 28. At this time, as illustrated in FIG. 9, the guide protrusion portion 436 of the second kick member 43 moves from the second position P2 to a third position P3 near the upper end of the front upper edge portion 55b. With this movement, as illustrated in FIG. 11B, the second kick member 43 rotates in the clockwise direction about the rotation support shaft 23d, and reaches the dead point by the spring member 29. As a result, the engagement protrusion portion 433 of the second kick member 43 takes an upright posture away from the holding protrusion portion 23f.

Figure 11C:
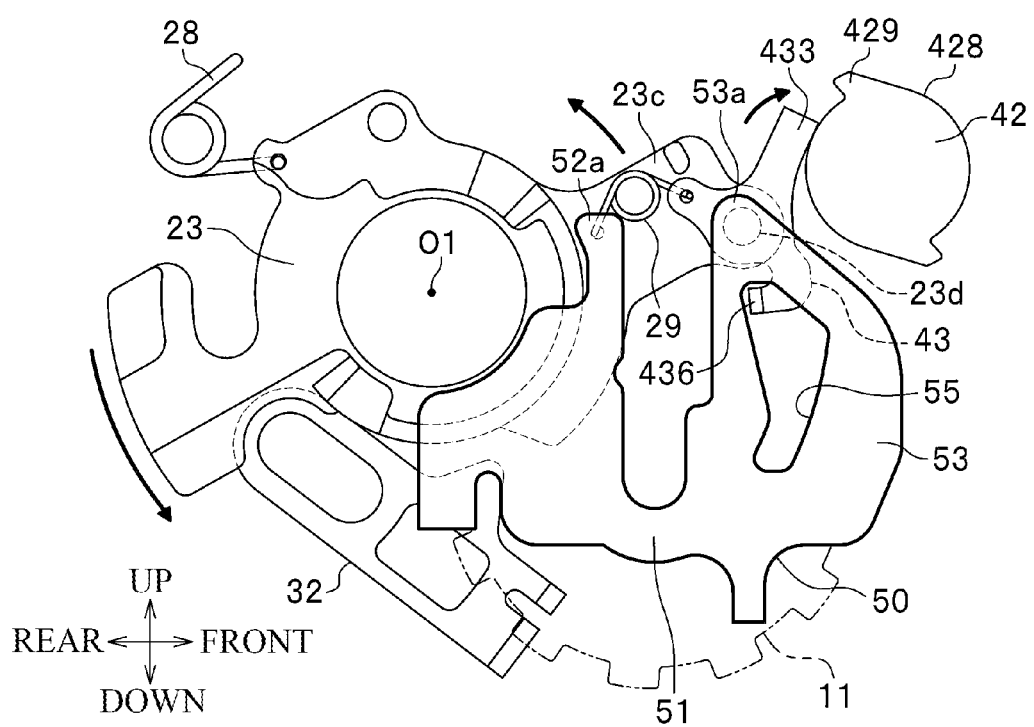
FIG. 11C is an explanatory view illustrating a positional relation of the second kick member in the driving force interruption state.

Thereafter, when the clutch lever 21 is further pushed down, the clutch mechanism 20 is brought into the driving force interruption state as illustrated in FIG. 11C. At this time, as illustrated in FIG. 9, the guide protrusion portion 436 of the second kick member 43 moves from the third position P3 along the upper edge portion 55a, and then moves to a fourth position P4 in the vicinity of the corners of the upper edge portion 55a and the rear upper edge portion 55f. With this movement, the second kick member 43 quickly rotates in the clockwise direction beyond the dead point as illustrated in FIG. 11C. As a result, in the driving force interruption state, the engagement protrusion portion 433 of the second kick member 43 abuts on the outer peripheral surface of the large diameter portion 428 of the returning gear 41 (can engage with the engagement claw 429).

Here, the second kick member 43 is configured to rotate toward the engagement gear 42 while moving upward along with the rotation of the clutch operating member 23. As a result, when the engagement protrusion portion 433 abuts on the large diameter portion 428 of the engagement gear 42, the engagement protrusion portion comes into contact with the outer peripheral surface of the large diameter portion 428 while sliding in the upward direction.

Figure 11D:
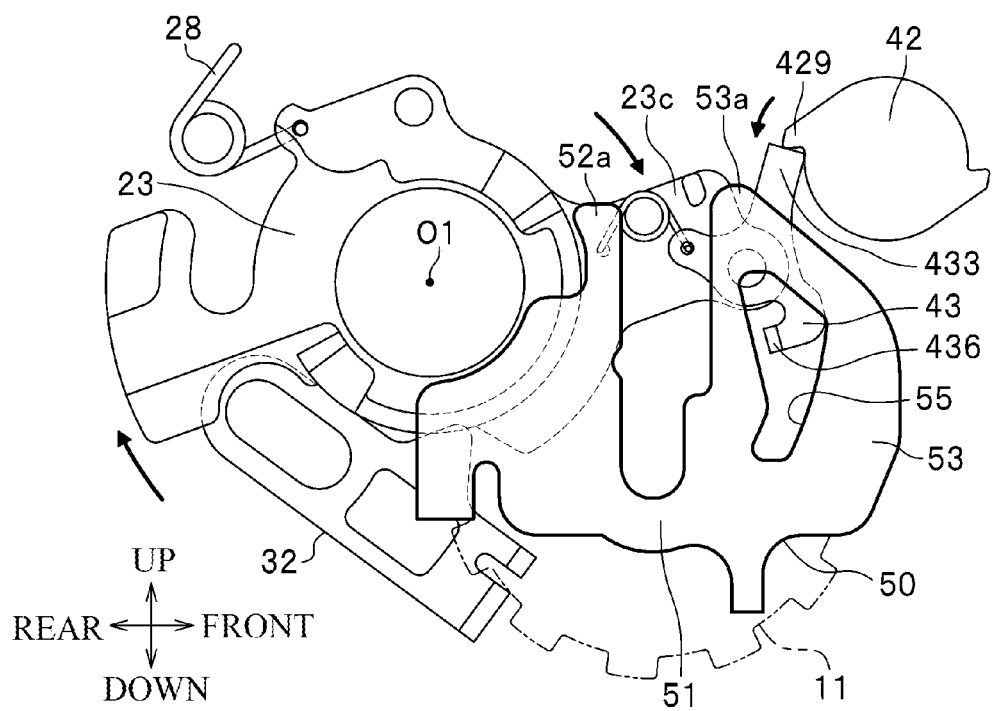
FIG. 11D is an explanatory view illustrating a positional relation of the second kick member when the second kick member moves from the driving force interruption state to the driving force transmission state by a second return mechanism.
Figure 11E:
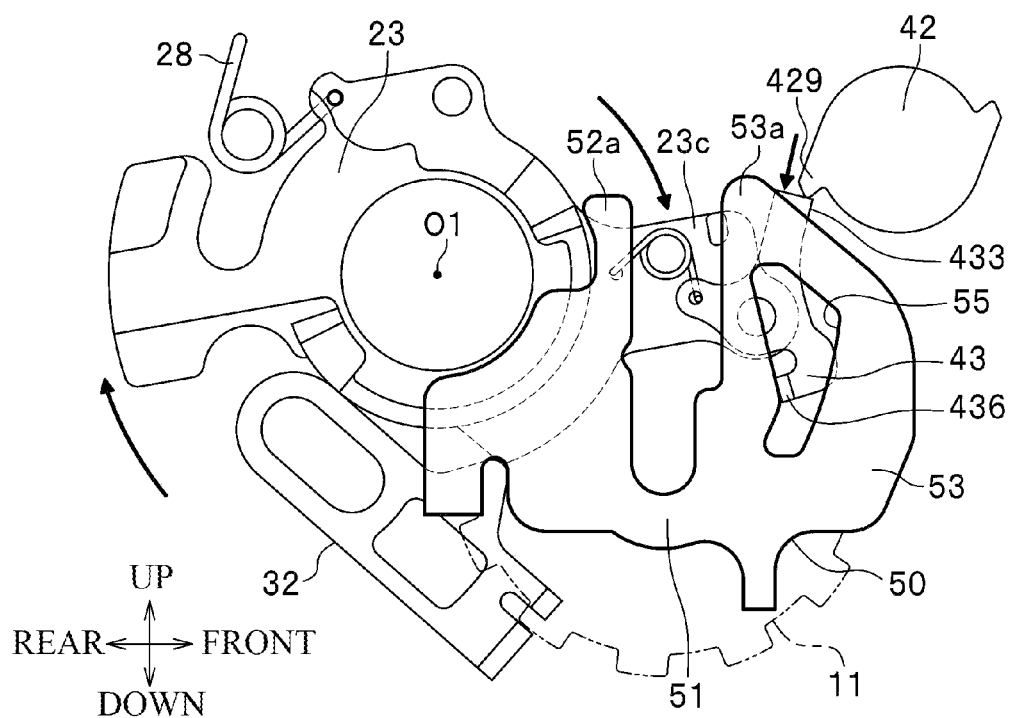
FIG. 11E is an explanatory view illustrating a positional relation when the second kick member further moves to the driving force transmission state from the state of FIG. 11D.

Next, an operation at the time of returning from the driving force interruption state to the driving force transmission state will be described. When the electric motor 6 is driven in the reverse rotation by the driving control of the control unit 60 in the driving force interruption state, the engagement gear 42 rotates in the counterclockwise direction via the returning gear 41. Then, as illustrated in FIG. 11D, the engagement claw 429 abuts on the engagement protrusion portion 433 of the second kick member 43 on the large diameter portion 428 of the returning gear 41, and thereafter, as illustrated in FIG. 11E, the engagement claw 429 pushes down the second kick member 43. At this time, as illustrated in FIG. 9, the guide protrusion portion 436 of the second kick member 43 moves downward from the fourth position P4 along the rear upper edge portion 55f and the rear lower edge portion 55e, and returns to the first position P1. By this movement, the second kick member 43 pushes the front end 23c of the clutch operating member 23 downward, and rotates the clutch operating member 23 in the clockwise direction. The rotation of the clutch operating member 23 returns the clutch mechanism 20 from the driving force interruption state to the driving force transmission state.

Figure 12:
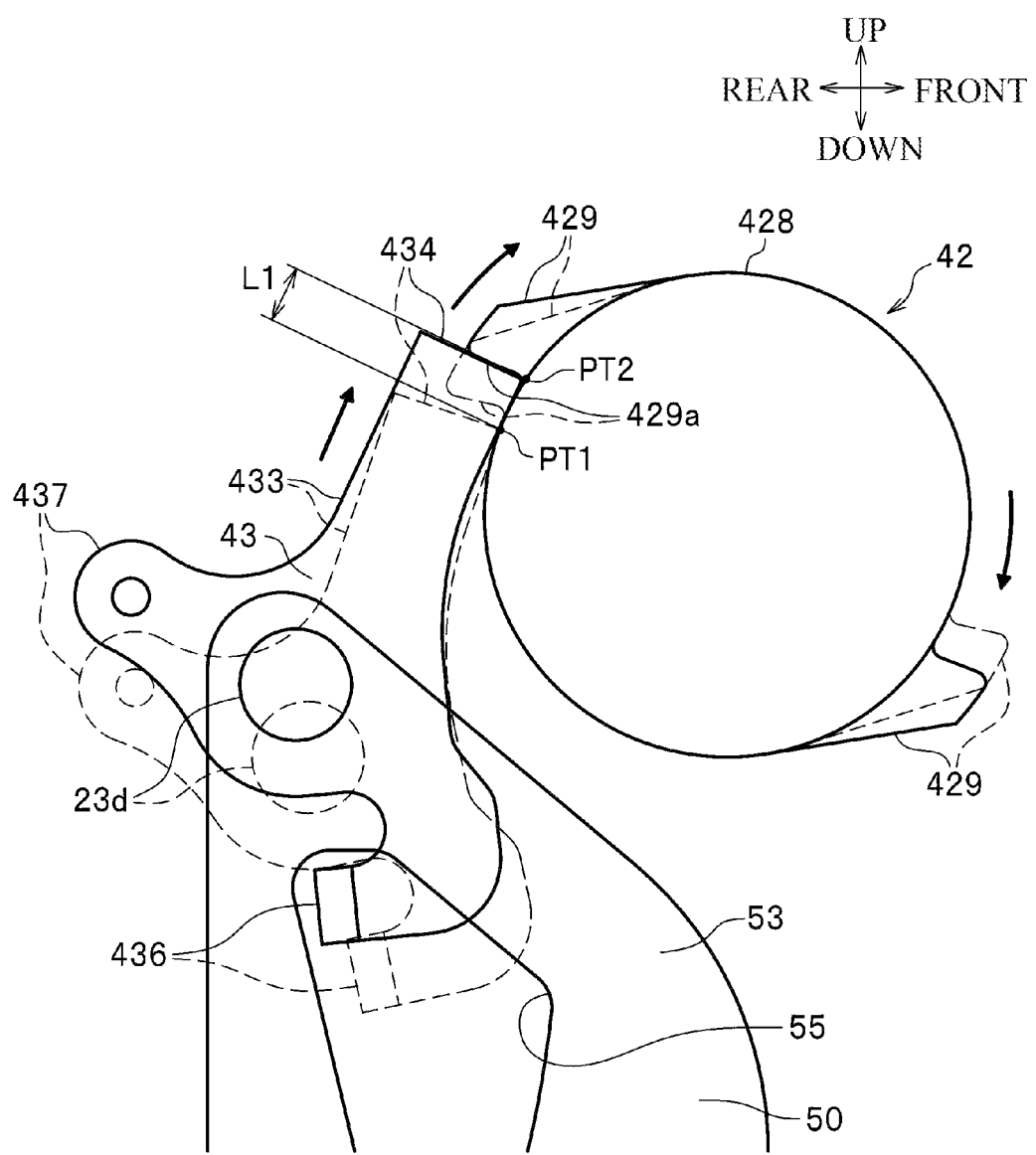
FIG. 12 is an explanatory view illustrating an action in a case where the engagement protrusion portion of the second kick member interferes with an engagement claw.

Next, an operation in a case where the engagement claw 429 is in a positional relation of interfering with the engagement protrusion portion 433 at the time of sliding when the engagement protrusion portion 433 abuts on the large diameter portion 428 will be described with reference to FIG. 12. In FIG. 12, reference numeral PT1 denotes an initial abutting position at which the engagement protrusion portion 433 of the second kick member 43 abuts on the large diameter portion 428 of the engagement gear 42, reference numeral PT2 denotes a position after sliding of the engagement protrusion portion 433 on the outer peripheral surface of the large diameter portion 428, and reference numeral L1 denotes a sliding distance thereof. Note that the engagement claw 429 of the engagement gear 42 stops at an arbitrary position in the circumferential direction, and the stop position is not controlled. FIG. 12 illustrates a case where the engagement claw 429 indicated by a broken line is located on the side in the sliding direction of the initial abutting position PT1 of the engagement protrusion portion 433.

As illustrated in FIG. 12, the engagement protrusion portion 433 of the second kick member 43 abuts on the outer peripheral surface of the large diameter portion 428 at the initial abutting position PT1 of the outer peripheral surface of the large diameter portion 428, and then moves by the sliding distance L1 to reach the position PT2 after the sliding. In the process of this movement, the engagement protrusion portion 433 abuts on the engagement claw 429 and presses the engagement claw 429 in the clockwise direction. Then, the large diameter portion 428 rotates in the clockwise direction against the biasing force of the spring member 425, and allows the sliding of the engagement protrusion portion 433. As a result, even when the engagement claw 429 is located in the sliding direction, the engagement claw 429 does not become an obstacle, and the engagement protrusion portion 433 suitably engages with the engagement claw 429.

According to the present embodiment described above, the second kick member 43 is rotatably supported by the right frame 2, and rotates in conjunction with the clutch operating member 23 to engage with/disengage from the engagement gear 42. Therefore, it is possible to increase a degree of freedom of the layout of the components and to prevent an increase in size of the reel body 1, as compared with a conventional configuration in which the returning member engages/disengages by linear sliding movement.

In addition, since the engagement gear 42 and the second kick member 43 can be provided between the spool shaft and the motor shaft with high space efficiency, the degree of freedom of the layout of the components can be increased, and the reel body 1 can be prevented from increasing in size.

Further, the engagement claw 429 is movable in the direction opposite to the rotation direction of the engagement gear 42 against the biasing force of the spring member 425. Therefore, even if the second kick member 43 interferes with the engagement claw 429 and is engaged to push the engagement claw 429 in the direction opposite to the rotation direction of the engagement gear 42 when the second kick member 43 is engaged, the engagement claw 429 is pushed by the second kick member 43 and flexibly moves in the opposite direction. As a result, an engagement state between the second kick member 43 and the engagement claw 429 is favorably maintained. Therefore, the clutch mechanism 20 can be quickly returned from the driving force interruption state to the driving force transmission state, and the responsiveness of the return mechanism is excellent.

In addition, even if the second kick member 43 interferes with the engagement claw 429 at the time of engagement of the second kick member 43, the engagement state is maintained favorably. Therefore, it is not necessary to manage the stop position of the engagement claw 429 toward the next return, and it is not necessary to install a sensor or the like for detecting the stop position of the engagement claw 429 and provide a control unit for adjusting the position of the engagement claw 429. Therefore, it is possible to realize cost reduction while preventing an increase in size of the reel body 1.

In addition, since the clutch mechanism 20 brought into the driving force interruption state by the rotation operation of the handle can be returned to the driving force transmission state by the first return mechanism 30, it is possible to obtain the fishing electric reel 100 which is easy to use and excellent in fishing operability.

Further, the control unit 60 is provided. As a result, when the clutch mechanism 20 is in the driving force interruption state and the rotation speed of the spool 5 satisfies a predetermined condition, or when the feeding amount of the fishing line reaches a preset feeding amount of the fishing line, the clutch mechanism 20 brought into the driving force interruption state can be automatically returned to the driving force transmission state. Therefore, it is possible to obtain the fishing electric reel 100 which is easy to use and excellent in fishing operability.

The embodiment according to the present disclosure has been described above. The present disclosure is not limited to the embodiment described above, and various modifications can be made.

For example, in the above embodiment, the engagement gear 42 and the second kick member 43 are disposed in the upper region of the right frame 2 between the spool shaft and the motor shaft. However, the present disclosure is not limited thereto, and the engagement gear 42 and the second kick member 43 may be disposed in the lower region of the right frame 2 between the spool shaft and the motor shaft. Further, the engagement gear 42 and the second kick member 43 may be disposed in a region overlapping the drive gear 11 or the like of the handle shaft 7.

In the above embodiment, the restriction portion is constituted using the guide hole 55 provided in the fixing plate 50. However, the present disclosure is not limited thereto, and the second kick member 43 may be guided using the edge portion of the fixing plate 50 or the like. Further, the fixing plate 50 is constituted by one plate, but may be constituted by combining a plurality of plates.

Further, the second kick member 43 is not limited to being disposed between the right frame 2 and the fixing plate 50, and may be disposed at a position away from the fixing plate 50.

Further, the fixing plate 50 is configured to retain the dividing spring member 28. However, the present disclosure is not limited thereto, and the dividing spring member 28 may be exposed to reduce the size.

What is claimed is:

1. A fishing electric reel comprising:
   a spool that is provided between frames of a reel body and rotates by receiving at least a driving force of an electric motor;
   a clutch mechanism that is provided on the side of one of the frames to which a handle shaft is attached and switches the spool between a driving force transmission state and a driving force interruption state; and
   a return mechanism that is provided on the side of one of the frames and causes the clutch mechanism that has been brought into the driving force interruption state to return to the driving force transmission state,
   wherein the clutch mechanism has a clutch operating member that is rotated by an operation of a clutch lever and is brought into the driving force interruption state,
   the return mechanism comprises
   a returning gear that is provided on a motor shaft of the electric motor,
   a clutch returning rotator that meshes with the returning gear and rotates, and
   a kick member that is rotatably supported by the clutch operating member, rotates in conjunction with rotation of the clutch operating member to engage with/disengage from the clutch returning rotator, and causes the clutch operating member that has been brought into the driving force interruption state to return to the driving force transmission state, and
   the clutch returning rotator and the kick member are disposed between a spool shaft supporting the spool and the motor shaft, wherein
   the clutch returning rotator comprises an engagement claw that engages with the kick member and a biasing member, and
   the engagement claw is configured to
   be capable of changing a position around an axis of the clutch returning rotator,
   acquire a first position moved in a rotation direction of the clutch returning rotator and a second position moved in a direction opposite to the first position, and
   is biased from the second position toward the first position by a biasing force of the biasing member.

2. The fishing electric reel according to claim 1, further comprising a handle operation return mechanism that causes the clutch mechanism that has been brought into the driving force interruption state by a rotation operation of a handle to return to the driving force transmission state,
   wherein the handle operation return mechanism comprises
   a ratchet that is attached to the handle shaft, and
   a handle interlocking kick member that engages with/disengages from the ratchet and causes the clutch operating member that has been brought into the driving force interruption state to return to the driving force transmission state.

3. The fishing electric reel according to claim 1, further comprising:
   a driving control unit that controls driving of the electric motor in a forward rotation direction or a reverse rotation direction;
   a detection unit that detects that the clutch mechanism is in the driving force interruption state;
   a calculation unit that calculates a rotation speed of the spool associated with feeding of a fishing line and calculates a feeding amount of the fishing line;

a rotation speed determination unit that determines whether or not the rotation speed of the spool calculated by the calculation unit satisfies a predetermined condition; and a feeding amount determination unit that determines whether or not the feeding amount of the fishing line calculated by the calculation unit has reached a preset feeding amount of the fishing line, wherein, when it is detected by the detection unit that the clutch mechanism is in the driving force interruption state and it is determined by the rotation speed determination unit that the rotation speed of the spool satisfies the predetermined condition, or when it is determined by the feeding amount determination unit that the feeding amount of the fishing line has reached the preset feeding amount of the fishing line, the driving control unit controls driving of the electric motor in the reverse rotation direction and causes the engagement claw of the clutch returning rotator to abut on the kick member.

* * * * *